US011803990B2

United States Patent
Chongfuangprinya et al.

(10) Patent No.: US 11,803,990 B2
(45) Date of Patent: Oct. 31, 2023

(54) DISTRIBUTION SYSTEM VISUALIZATION METHOD AND COMPUTING SYSTEM

(71) Applicant: Hitachi, Ltd., Tokyo (JP)

(72) Inventors: Panitarn Chongfuangprinya, San Jose, CA (US); Bo Yang, Santa Clara, CA (US); Yanzhu Ye, San Jose, CA (US); Masanori Abe, Santa Clara, CA (US); Anthony Hoang, Sunnyvale, CA (US); Natsuhiko Futamura, Santa Clara, CA (US)

(73) Assignee: HITACHI, LTD., Chiyoda-Ku (JP)

( * ) Notice: Subject to any disclaimer, the term of this patent is extended or adjusted under 35 U.S.C. 154(b) by 73 days.

(21) Appl. No.: 17/527,059

(22) Filed: Nov. 15, 2021

(65) Prior Publication Data
US 2023/0154079 A1    May 18, 2023

(51) Int. Cl.
*G06T 11/20* (2006.01)
(52) U.S. Cl.
CPC .......... *G06T 11/206* (2013.01); *G06T 11/203* (2013.01)
(58) Field of Classification Search
CPC ............................ G06T 11/203; G06T 11/206
See application file for complete search history.

(56) References Cited

U.S. PATENT DOCUMENTS

| 6,078,327 A * | 6/2000 | Liman ................... G06F 3/0481 715/854 |
| 2012/0185804 A1 | 7/2012 | Dam |
| 2014/0033173 A1* | 1/2014 | Frenkiel ................... G06F 8/74 717/123 |

OTHER PUBLICATIONS

Distribution system analysis (CYMDIST), accessed at https://www.eaton.com/us/en-us/products/utility-grid-solutions/software-modules/distribution-system-analysis-package-CYMDIST.html, on Mar. 26, 2021.
GridOS Platform, accessed at https://www.opusonesolutions.com/gridos-platform/, on Mar. 26, 2021.

* cited by examiner

*Primary Examiner* — Michelle L Sams
(74) *Attorney, Agent, or Firm* — Procopio, Cory, Hargreaves & Savitch LLP

(57) ABSTRACT

Example implementations described herein provide systems and methods for visualization of power distribution feeder networks. The systems and methods involve setting a limit of objects of the power distribution network to be displayed on a map, the objects comprising at least nodes and links between the nodes, the links comprising at least conductive lines; when the total number of the objects exceeds a limit, selecting one or more subsets of the conductive lines based on one or more conditions related to the conductive lines; and generating a first visualization displaying the map comprising a subset of the objects including the one or more subsets of the conductive lines, wherein a number of displayed objects is less than or equal to the limit.

14 Claims, 15 Drawing Sheets

DISTRIBUTION SYSTEM VISUALIZATION METHOD AND COMPUTING SYSTEM

BACKGROUND

Field

The present disclosure is generally related to storage systems, and mom specifically, to systems and methods for efficiently and optimally generating visualizations of power distribution network topologies.

Related Art

Penetration of distributed energy resources (DERs) such as photovoltaic distributed generation (PV-DG), wind farm, and battery storage has grown significantly in the last ten years due to several factors such as policies, incentives, technologies, and cost reduction. This leads to adverse impacts on distribution systems and higher cost of analyzing the grid to accommodate, manage, and mitigate DERs to provide smooth and reliable operation of the grid. To study an impact of DER, a user may require both a distribution feeder model and a distribution planning simulation platform or a computing system.

A distribution feeder model is comprised of several classes of objects. Typical distribution feeder models are small, with less than 5,000 objects and typically between 3,000 and 5,000 objects. These small scale distribution feeder models can be visualized in a distribution planning simulation platform with minimal performance problem.

With increased penetration of DERs, there are needs to model behind-the-meter assets such as inverters, PV-DGs, battery storage devices, end-use-loads, etc. This adds a large number of objects to a distribution feeder model. Some distribution feeder models with behind-the-meter assets may contain 10,000-30,000 objects. Multiple feeders in a single model may contain over 100,000 objects. However, a computing system has limited resources and a user may suffer performance problems when working with a large feeder model, especially during visualization and editing a model via a distribution planning simulation platform. For example, if a computing system can support up to 5,000 objects, it may become slow and unresponsive when visualizing more than 5,000 objects.

Example related art implementations provides systems and simulation platform for distribution system planning. However, these systems do not provide any method, design, visualization, or user interface related to improving visualization performance of behind-the-meter equipment or edge device.

Thus, there remains a need for providing a user interface to model, visualize, and edit behind-the-meter equipment or edge device in detail and efficiently.

SUMMARY

Example implementations disclosed herein provide a distribution system visualization method and computing system for generating a distribution system visualization. Example implementations disclosed herein improve performance and provide an optimal user experience of a distribution planning simulation platform that can be utilized during distribution planning process, especially visualization of a large feeder model with DER and a large number of behind-the-meter assets. For example, a feeder model having 25,000 objects or more. Thus, the implementation disclosed herein can accelerate integration of DER to the grid and provide economic and stable operation of the electricity markets.

Example implementations disclosed herein offer significant improvements over the related art implementations by providing a user interface to model, visualize, and edit behind-the-meter equipment or edge devices in detail and efficiently. For example, implementations disclosed here dynamically select objects (e.g., conductive line, transformer, DER, behind-the-meter equipment, and/or edge devices) for generating a visual representation of the topology of a distribution feeder model based on one or more conditions related to the objects. By dynamically selecting and displaying objects, slowdowns and unresponsiveness in the system utilized for the distribution planning process is minimized, and in some cases completely avoided.

Example implementations disclosed herein may include setting a limit of objects to be displayed on a first visualization that displays a main map view of the topology of a distribution feeder model. Objects may refer to node objects and link objects that connect two node objects. In some implementations, a total number of the objects may be checked and, in a case where the total number of objects is less than or equal to the limit, implementations disclosed herein may be configured to display all objects on the main map view. In some implementations, alone or in combination, where the total number of objects exceeds the limit, the total number of link objects may be checked and, in a case where the total number of link objects is less than or equal to the limit, implementations disclosed herein may display all link objects on the main map view. In yet further implementations, alone or in combination, where the total number of link objects exceeds the limit, a total number of conductive line objects may be checked and, in a case where the total number of conductive line objects is less than or equal to the limit, implementations disclosed herein may display all conductive line objects on the main map view. Some implementations provide for selecting a portion (e.g., subset) of the conductive line objects based on one or more conditions (e.g., longest length, etc.) related to the conductive line objects, and displaying the selected portion of the conductive line objects. In some examples, the one or more conditions may include, for example, a first condition such as conductive line objects exceeding a length threshold. In some implementations, the one or more conditions may also include, for example, a second condition that is different from the first conditions. An example second condition may be, for example, a random selection method, every other selection method, every two selection method, etc.

Example implementations may further include a stand-by functionality, where the visualization of the topology awaits further inputs, for example, from a user via a user interface. Some example implementations may be configured to dynamically display additional link and/or node objects based on an input selecting an object. For example, in response to a user selection of an object not currently displayed on a main map view (e.g., displayed in a second visualization of the distribution feeder model and selection input thereon), implementations disclosed herein may dynamically display the selected object on the main map view. Optionally, the selected object may be highlighted on the main map view to assist pinpoint identification of the selected object. As another optional aspect, the selected object may be hidden on the main map view after a certain time period to reduce the impact on the resource utilization required to display the selected object. The input may select a plurality of objects for display on the main map view. As another example, implementations herein may be configured to dynamically display additional objects up to the limit based on a zoom level.

Some node objects in the distribution feeder model may contain one or more children objects. Some example implementations may be configured to display such parent objects in the main map view, while not displaying the children objects in the main map view. For example, a child map view may be provided in visualization, separate from the main map view, that displays a parent object with any children object(s) to reduce the utilization of the limited resource of the system.

Some example implementations may be configured to display one or more graphical indicators next to an object name in a tree diagram indicative that the associated object contains one or more children object(s). Some example implementations may be configured to display an object, which has one or more children object(s), using a graphical indicator indicative that the object has one or more children objects. The graphical indicator may be, for example, an edge or an outline generated around the object in the main map view.

Aspects of the present disclosure can involve a power distribution network visualization method. The method involves setting a limit of objects of the power distribution network to be displayed on a map, the objects comprising at least nodes and links between the nodes, the links comprising at least conductive lines; when the total number of the objects exceeds a limit, selecting one or more subsets of the conductive lines based on one or more conditions related to the conductive lines; and generating a first visualization displaying the map comprising a subset of the objects including the one or more subsets of the conductive lines, wherein a number of displayed objects is less than or equal to the limit.

Aspects of the present disclosure can involve a power distribution network visualization system. The system involves one or more memories configured to store a program, and one or more processors coupled to the one or more memories. The one or more processors may be configured to execute the instructions to: set a limit of objects of the power distribution network to be displayed on a map, the objects comprising at least nodes and links between the nodes, the links comprising conductive lines; when the total number of the objects exceeds a limit, select one or more subsets of the conductive lines based on one or more conditions related to the conductive lines; and generate a first visualization displaying the map comprising a subset of the objects including the one or more subsets of the conductive lines, wherein a number of displayed objects is less than or equal to the limit.

Aspects of the present disclosure can involve a non-transitory computer-readable medium, storing instructions for generating a visualization of a power distribution network. The instructions can involve: setting a limit of objects of the power distribution network to be displayed on a map, the objects comprising at least nodes and links between the nodes, the links comprising conductive lines; when the total number of the objects exceeds a limit, selecting one or more subsets of the conductive lines based on one or more conditions related to the conductive lines; and generating a first visualization displaying the map comprising a subset of the objects including the one or more subsets of the conductive lines, wherein a number of displayed objects is less than or equal to the limit.

Aspects of the present disclosure can involve an apparatus for generating a visualization of a power distribution network. The apparatus involving a means for setting a limit of objects of the power distribution network to be displayed on a map, the objects comprising at least nodes and links between the nodes, the links comprising at least conductive lines; when the total number of objects exceeds a limit, a means for selecting one or more subsets of the conductive lines based on one or more conditions related to the conductive lines; and a means for generating a first visualization displaying the map comprising a subset of the objects including the one or more subsets of the conductive lines, wherein a number of displayed objects is less than or equal to the limit.

BRIEF DESCRIPTION OF THE DRAWINGS

The detailed description is set forth with reference to the accompanying figures. The figures are examples and not intended to limit the scope of the claims. The use of the same reference numbers in different figures indicates similar or identical items or features.

DETAILED DESCRIPTION

Figure 1:
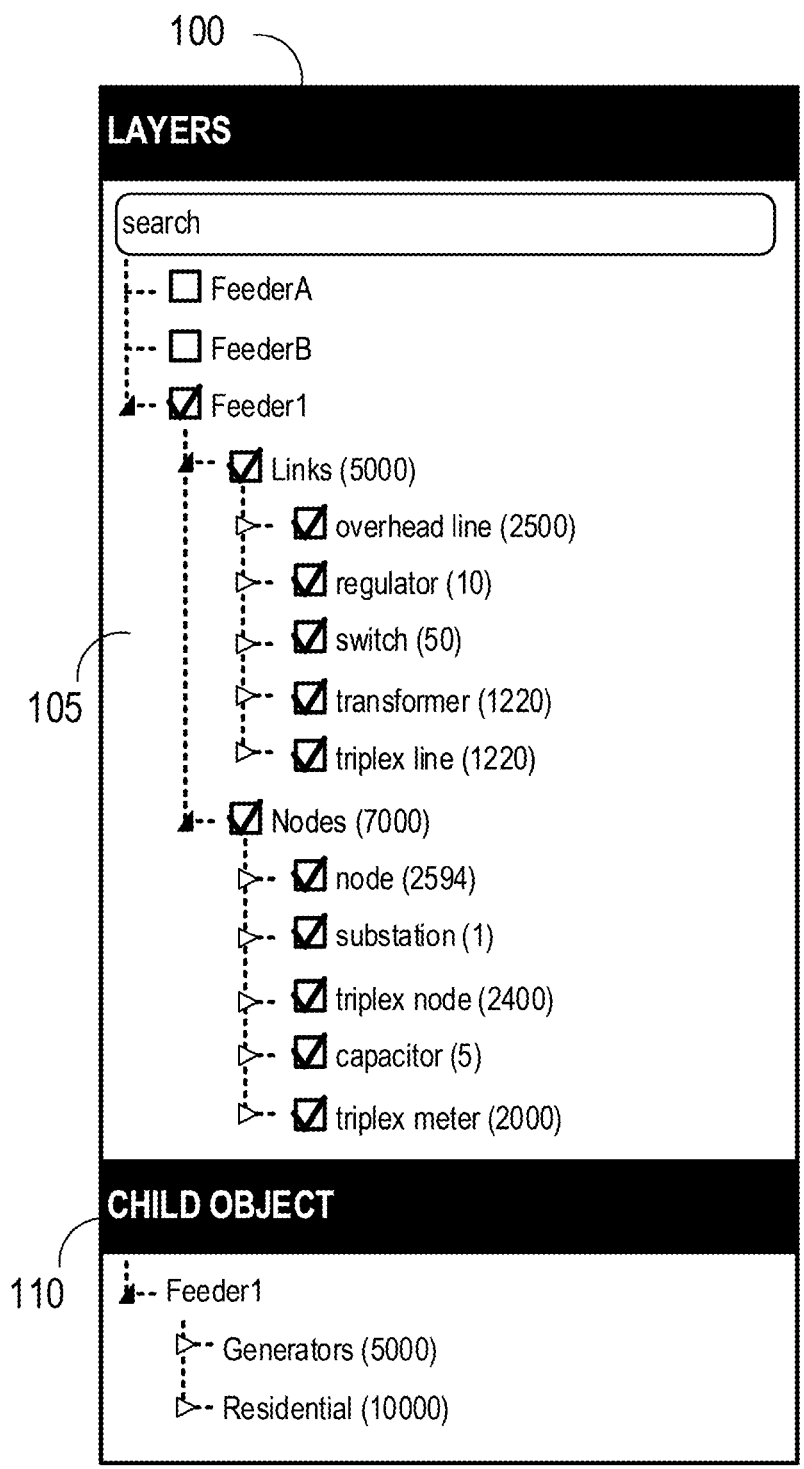
FIG. 1 illustrates an example visualization of a distribution feeder model in the form of a tree diagram, in accordance with example implementations disclosed herein.

The following detailed description provides details of the figures and example implementations of the present application. Reference numerals and descriptions of redundant elements between figures are omitted for clarity. Terms used throughout the description are provided as examples and are not intended to be limiting. For example, the use of the term "automatic" may involve fully automatic or semi-automatic implementations involving user or administrator control over certain aspects of the implementation, depending on the desired implementation of one of ordinary skills in the art practicing implementations of the present application. Selection can be conducted by a user through a user interface or other input means, or can be implemented through a desired algorithm. Example implementations as described herein can be utilized either singularly or in combination and the functionality of the example implementations can be implemented through any means according to the desired implementations.

Further, in the following description, the information is expressed in a table format, but the information may be expressed in any data structure. Further, in the following description, a configuration of each information is an example, and one table may be divided into two or more tables or a part or all of two or more tables may be one table.

FIG. 1 illustrates an example visualization 100 of a distribution feeder model Feeder1 in the form of a tree diagram 105, in accordance with example implementations disclosed herein. Visualization 100 may be generated by a computing system, for example, by computing environment 1500 of FIG. 15. The generated visualization 100 may be presented as part of a graphical user interface (GUI) that is displayed on a display of the computing environment and may be interactable by a user view GUI. The visualization may be utilized, for example, as part of distribution planning process, for example, via a distribution planning simulation platform.

In the illustrative example of FIG. 1, Feeder1 comprises a plurality of link objects and a plurality of node objects. Objects may represent any equipment that transfers electricity from a sub-station, downstream or down the line, to electricity consuming equipment. As used herein, link objects may refer to several classes of objects such as, but not limited to, overhead (OH) lines (also referred to as OH conductors), transmission lines, regulators, switches, transformers, triplex lines, underground lines (or cables), fuses, reclosers, sectionalizers, series reactors, and so on. Furthermore, as used herein, the term "conductive line" or "conductive lines" may refer to one or more classes of link objects, such as but not limited to, OH line objects, underground line objects, transmission line objects, and other similar objects. In some implementations, conductive lines may refer to the OH line object class only, while in others conductive lines may refer to OH lines and other link object classes. As used herein, node objects may refer to several classes of objects such as, but not limited to, nodes, substations, triplex nodes, capacitors, triplex meters, loads, meters, motors, triplex loads, and so on. Each class of objects may comprise a plurality of individual objects, which may be, for example, DER, behind-the-meter equipment, and/or edge devices. In this illustrative example, each node object may be associated with (e.g., in a database storing data of the distribution feeder model) geographic information, such as latitude and longitude coordinates. Each node object may be generated and displayed in a main map view according to the geographic information (e.g., as described in FIG. 2 below). In the example implementations herein, a link object may be a connector between two node objects, and thus geographic information for displaying each link object may be based on the geographic information for the corresponding nodes.

In some example implementations, the visualization 100 may include parenthetical numbers adjacent to objects in the tree diagram 105. The number may indicate a number of objects underneath the object class associated with the number. That is, in the illustrative Feeder1, there are 5000 link objects, which includes 2500 individual OH lines, 10 individual regulators, 1220 individual transformers, and 1220 individual triplex lines. Similar information is provided for the number of node objects and each respective node object class (e.g., 7000 node objects). Underneath each object class may be a listing of each object with identifying information and geographic information.

The visualization 100 may also include child objects tree 110. Child objects are objects that belong to (e.g., associated with) a parent object and shares the same geographic information as the parent object. In the example of FIG. 1, there are 5,000 objects considered as children objects for Feeder1.

Thus, in this illustrative example, there are a total of 27,000 objects (e.g., link, node, and child objects), belonging to various classes and geographic information, that can be shown in a main map view.

While the foregoing discussion is made with reference to Feeder1, such reference is provided as an illustrative example only. Example implementations provided herein may include a plurality of distribution feeder models as shown in FIG. 1 (e.g., FeederA, FeederB, etc.). Each feeder model may be represented by corresponding tree diagram underneath, which includes respective link, node, and child objects.

Figure 2:
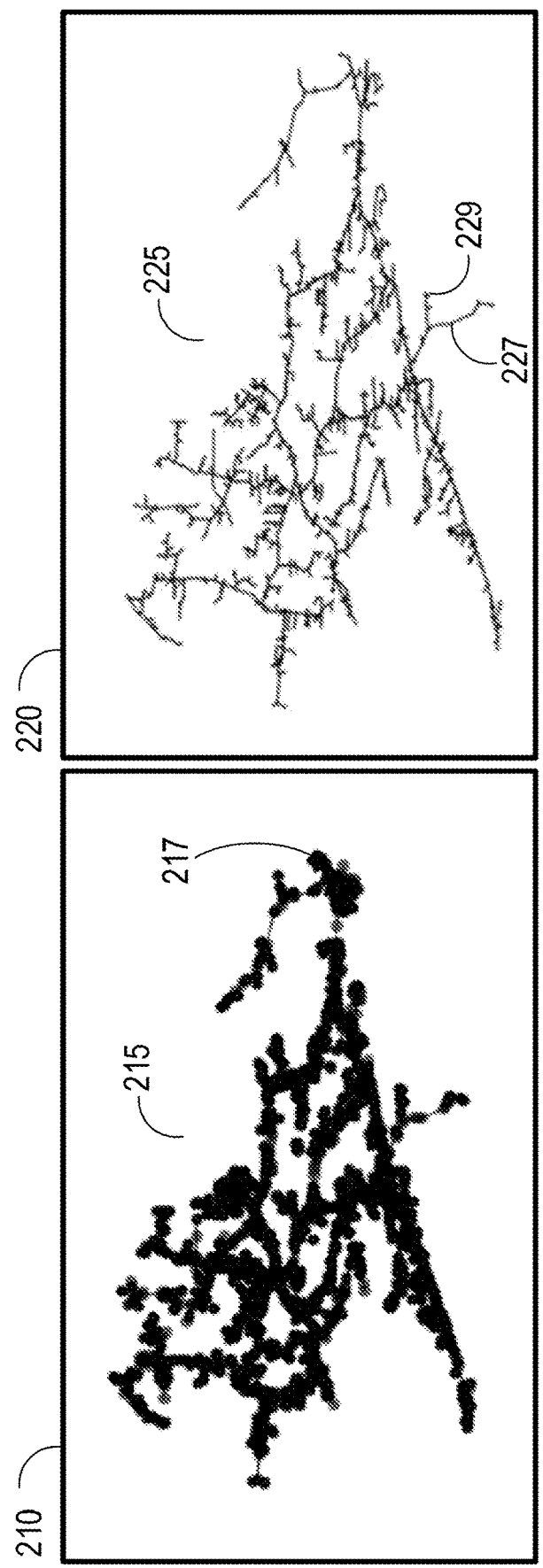
FIG. 2 illustrates example visualizations of a topology of the distribution feeder model of FIG. 1 in a main map view, in accordance with example implementations disclosed herein.

FIG. 2 illustrates example visualizations 215 and 225 a topology of the distribution feeder model of FIG. 1 in main map views 210 and 220, in accordance with example implementations disclosed herein. FIG. 2 illustrates a main map view 210 depicting a first visualization 215 displaying all objects of the distribution feed model Feeder1 (e.g., over 27,000 objects) from sub-station 217 and a main map view 220 depicting a second visualization 225 displaying only link objects of the distribution feed model Feeder1. The graphical representation of the objects in visualizations 215 and 225 are based, in part, on the geographic information of the node objects included in Feeder1. That is, for example, each node and link object in the main map views 210 and 220 are positioned based on the geographic information associated with each node and link object.

Figure 15:
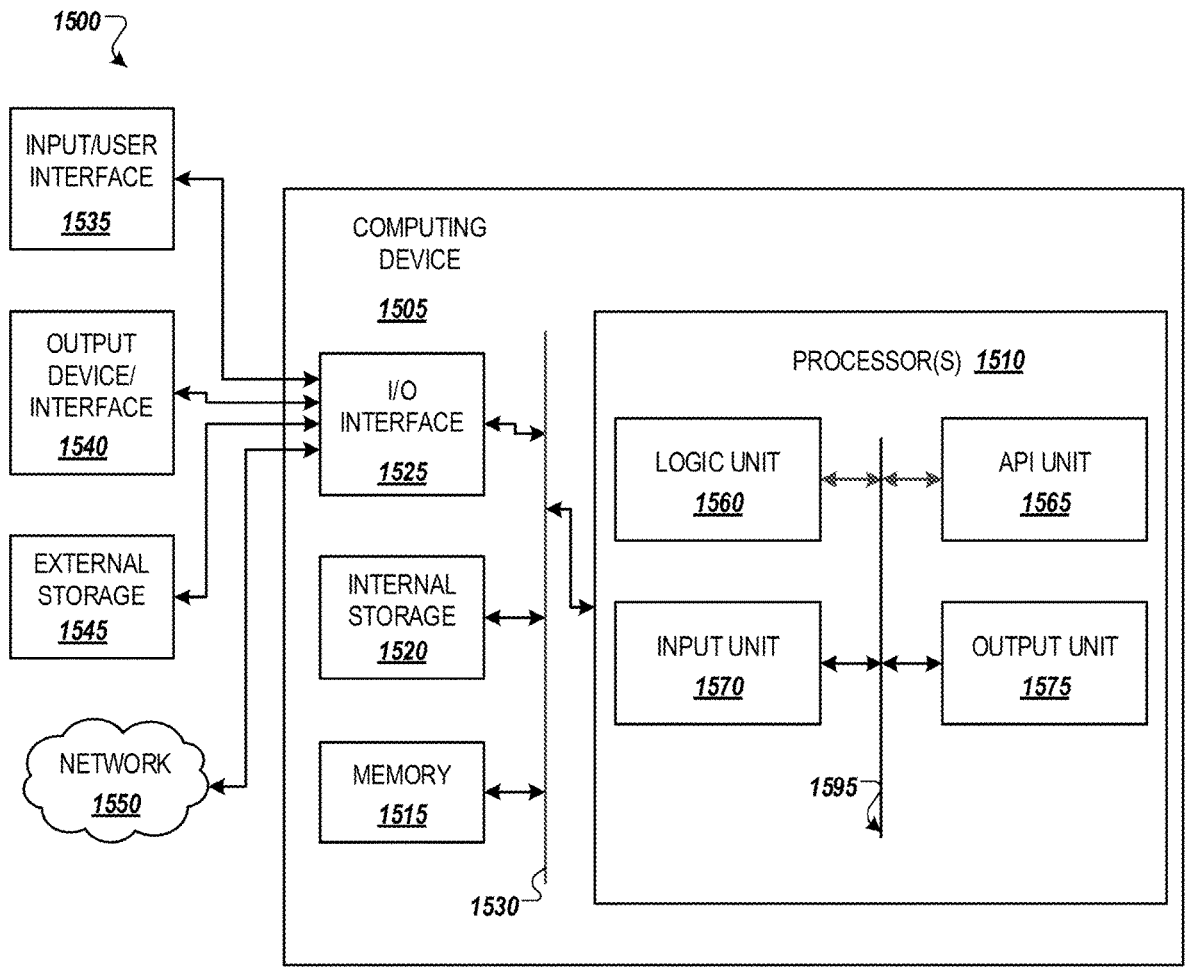
FIG. 15 illustrates an example computing environment with an example computer device suitable for use in some example implementations.

Visualizations 215 and/or 225 may be generated by a computing system, for example, by computing environment 1500 of FIG. 15. The generated visualizations 210 and/or 220 may be presented as part of a graphical user interface (GUI) that is displayed on a display of the computing environment and may be interactable by a user view GUI and visualization may be utilized, for example, as part of distribution planning process, such as via a distribution planning simulation platform.

As noted above the visualization 215 displays all objects of Feeder1. In this case, child objects that belong to residential and generators group, especially behind-the-meter objects such as house, inverter, solar, and battery, may share the same geographic information. Displaying objects with the same geographic information is redundant and does not assist in displaying connectivity among objects properly. In addition, such information may not provide useful information to a user regarding the topology.

This redundancy in displaying all objects of large distribution feeder models at the same time causes slowdowns in computing systems displaying the information due to unnecessary utilization of computing resources. Thus, the system may become unresponsive, for example, due to trying to load all objects at once. For example, if the system resources can efficiently support up to 5,000 objects, displaying lower than 2,500 objects provides rapid response for a user to use the system efficiently. Between displaying between 2,500 to 5,000 objects may cause the system to slow down, while providing sufficient response. However, at 5,000 objects or more, the system may become unresponsive.

Referring to main map view 220, the visualization 225 displays only the link objects. The total number of all link objects in Feeder1 is 5,000 (e.g., a combination of 2,500 overhead line objects and 2,500 of the other link objects such as regulator, switch, transformer, and triplex line).

From a whole feeder model viewpoint (e.g., viewing the entire topology of the distribution feeder model), displaying only link objects may be a good representation of the topology. However, example implementations disclosed herein are configured to further reduce the number of objects to be displayed, while maintaining a good representation of the topology of the distribution feeder model, as describe below, for example, in connection to FIG. 3.

Thus, example implementations disclosed herein may take into consideration that certain link objects may be relatively longer than other link objects. For example, overhead line objects (e.g., object 227 is an example illustrative of a longer line representative of an overhead line object) are relatively longer in length and display on the main map view as longer lines while other link objects relatively shorter in length may be shown as shorter lines or dots in the main map view (e.g., object 229).

Figure 3:
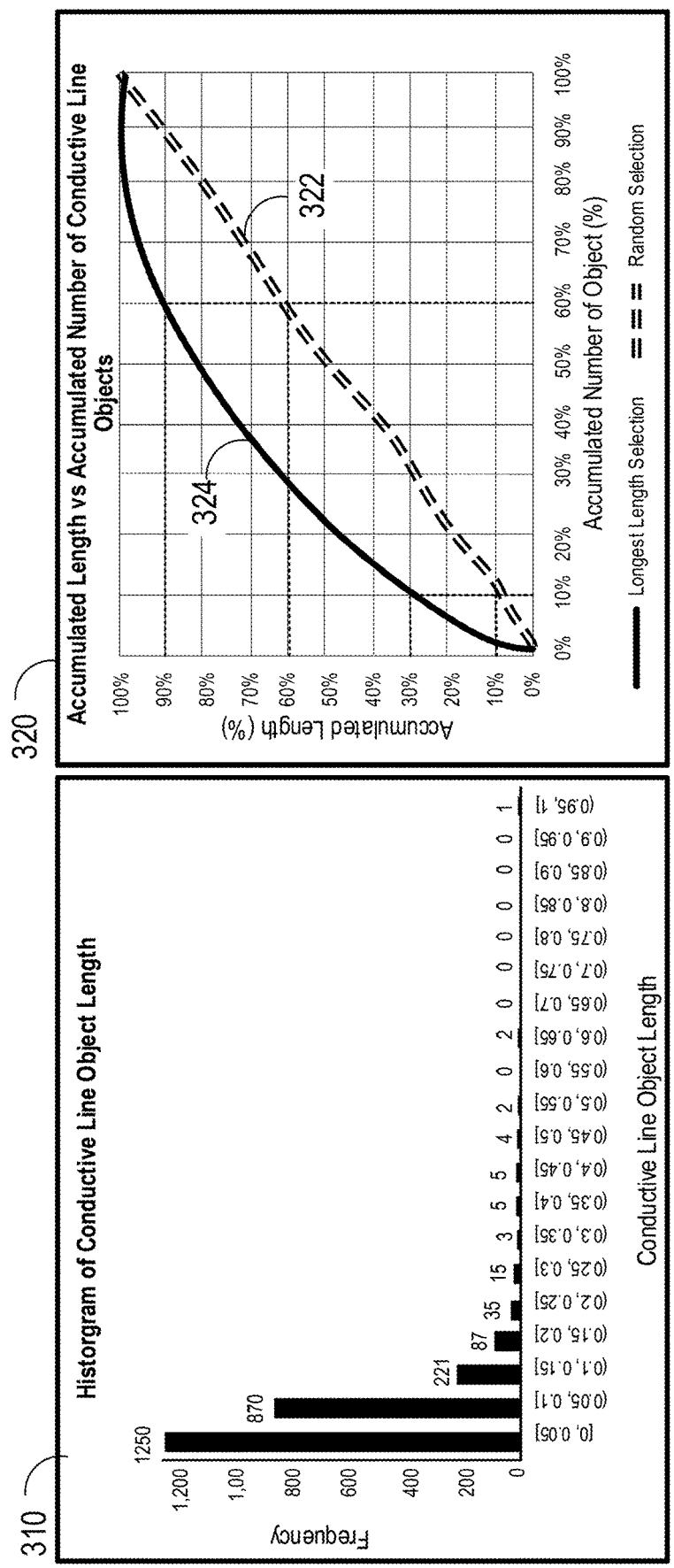
FIG. 3 illustrates example plots of information related to lengths of link object and a number of link objects, in accordance with example implementations disclosed herein.

FIG. 3 illustrates example plots 310 and 320 of information related to link object lengths and number of link objects of the example of the distribution feeder model Feeder1.

Plot 310 illustrates an example histogram of lengths of link object of the distribution feeder model Feeder1 from FIG. 1. In some examples, plot 310 may illustrate a histogram of lengths of all link objects, while, in another example, plot 310 may illustrate a histogram of lengths of links of a respective class or group of classes of link objects (e.g., conductive line objects). Plot 310 illustrates normalized lengths of link object on the x-axis, where the longest length is normalized to 1 and the shortest length is 0. The lengths are grouped into ranges. On the y-axis, plot 310 provides frequency (e.g., number of link objects corresponding to each range of lengths). For example, in the illustrative example of plot 310, there are 1,250 link objects (or 50%) of the link objects that have a length shorter than 0.05 unit. Similarly, 2,120 link objects (or 84%) of the conductive line objects are shorter than 0.10 unit. The remaining 16% of the link objects are relatively long, for example, between 0.10 to 1.00 unit.

Plot 320 illustrates an example line graph of accumulated length of topology of the distribution feeder model versus accumulated number of link objects of the distribution feed model for two example selection methods. The double dotted line 322 illustrates a random selection method, whereby link objects are selected randomly from all link objects. The solid line 324 illustrates a second selection method in accordance with the example implementations disclosed herein, for example, selection of link objects based on relative length of the link objects. In some implementations, plot 320 may be all link objects, a class of links objects, or a plurality of classes. For example, as shown in plot 320, the link objects considered are conductive line objects.

With the random selection method plotted as line 322, 10% of accumulated number of link objects represent approximately 10% of accumulated length of the topology (e.g., represents 10% of the entire length of the distribution feeder model). As another example point, 60% of accumulated number of objects represent approximately 60% of accumulated length of the feeder.

With the second selection method plotted as line 324, where selection of link objects is based on relative length, a smaller percentage of accumulated number of link objects may represent a greater percentage of the accumulated length (e.g., fewer link objects are needed to represent a greater percentage of the topology of the distribution feeder model). In this selection method, link objects of relatively longer lengths are selected prior to link objects of shorter length. For example, 10% of accumulated number of objects represent approximately 30% of accumulated length of the feeder and 60% of accumulated number of objects represent approximately 90% of accumulated length of the feeder. Additional number of objects provide less additional information.

By leveraging a selection method according to the implementations disclosed herein, such as selection based on the relative length, a small number of objects can be utilized to represent a majority of the feeder topology.

Figure 4:
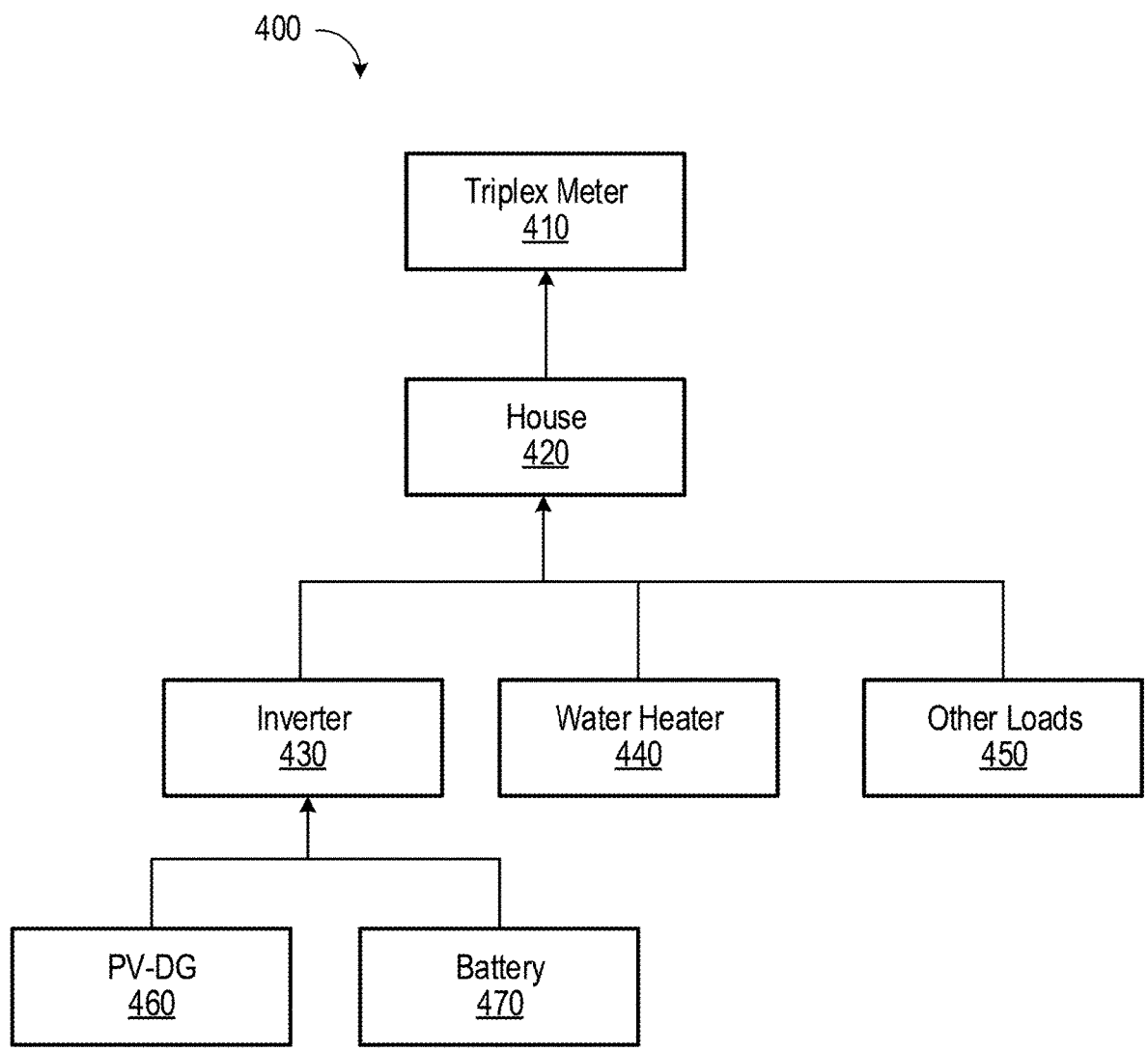
FIG. 4 illustrates an example visualization of a child map view of the distribution feeder model of FIG. 1, in accordance with example implementations disclosed herein.

FIG. 4 illustrates an example visualization 400 of a child map view, in accordance with example implementations disclosed herein. The visualization 400 generates a graphical representation of a parent object 410 and corresponding children objects 420-470. The visualization 400 may be generated separate from a main map view (e.g., main map views 210 and/or 220) to reduce the utilization of the limited resource of the system. Similarly, the visualization 400 may be generated separately from the visualization 100 of FIG. 1.

In the example visualization 400, a parent object 410 (e.g., triplex meter) is displayed with six behind-the-meter objects (e.g., children objects 420-470) of the distribution feeder model from FIG. 1 that share the same geographic information as the parent object 410. The example visualization 400 is a child map view of a single house object 420 connected to a triplex meter object 410. The house object 420 contains an inverter object 430, a water heater object 440, and other load objects 450 (e.g., one or more additional loads on the feeder model). Inverter 430 may be connected to a PV-DG (Photovoltaic Distribution Generation) object 460 and a battery storage object 470. While house object 420 is a child object of the triplex meter object 410, the house object 420 is also a parent object of the inverter object 430, the water heater object 440, and the other load objects 450. In various implementations, only node objects may have children objects.

In various example implementations, on a main map view, the system may display only an upper most parent object (e.g., the triplex meter object 410 in the illustrative example of FIG. 4) that is connected directly to other objects of the distribution feeder model as shown in the main map view 210 of FIG. 2. For example, based on the example distribution feeder model in FIG. 1, only 12,000 objects may be displayed in the main map view instead of all 27,000 objects of the distribution feeder model.

In some implementations, visualization 400 may be displayed as a separate child map view (e.g., a separate window or pane of the GUI either adjacent to or overlaid) when a user requests to visualize information of children object(s) of a selected parent object. For example, as described below in greater detail, a user may select a parent object from the tree diagram 105 of FIG. 1 and/or the main map view, and in response to the selection a child map view may open in a second window pane or viewport. The GUI may provide an interface through which the user can switch between the main map view and the child map view. The child map view may be closed at any time.

Separation of child map view from the main map view may reduce redundancy and cluttering that may result from showing multiple objects sharing the same geographical information in the main map view. This method reduces utilization of the resource of the system significantly.

Figure 5:
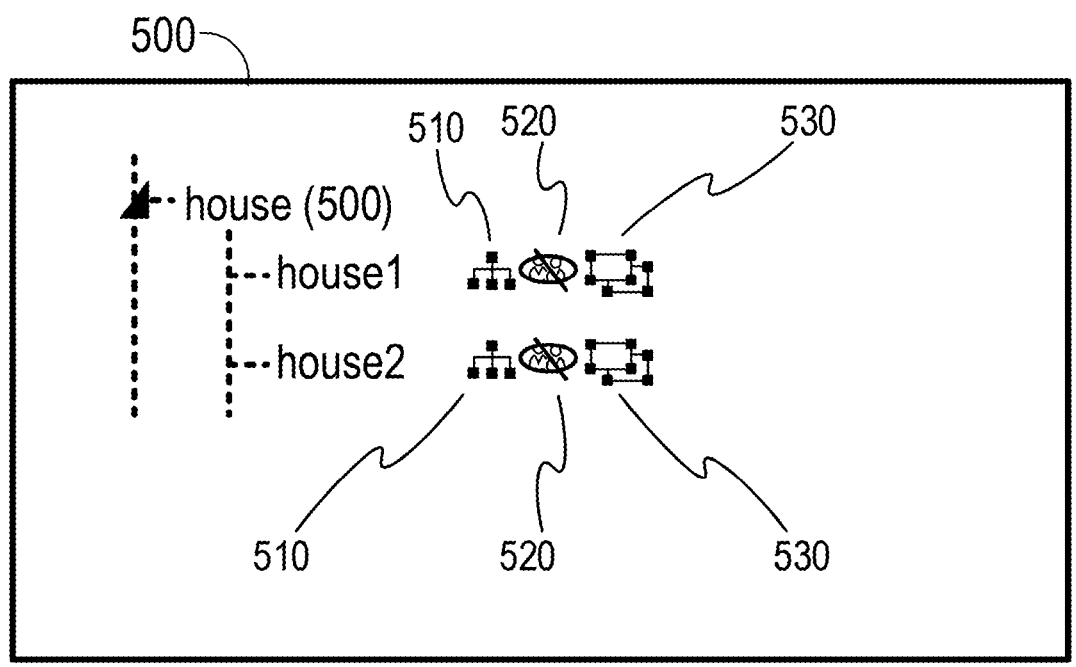
FIG. 5 illustrates a portion of the tree diagram shown in FIG. 1 with examples of graphic indicator(s) indicative of object visualization characteristics, in accordance with example implementations disclosed herein.

FIG. 5 illustrates a portion 500 of tree diagram 105 of the example visualization of the distribution feeder model of FIG. 1, in accordance with example implementations disclosed herein. FIG. 5 also illustrates examples of graphical indicators 510-530 indicating child relationship properties of objects of the tree diagram 105.

In the illustrative example of FIG. 5, portion 500 is a portion of the tree diagram 105 including a class of node objects. In this example, the top level node object in the portion 500 is a house object class. The house class may be displayed underneath the residential class of node objects in the child objects tree 110 portion of the tree diagram 500. For example, as shown in FIG. 1, child objects tree 110 includes residential class of nodes and underneath the residential class includes, among other possible nodes, the house class node objects shown as the top level of FIG. 5. Further underneath the house class of node objects are distinct node objects, such as house1 and house2 in the illustrative example of FIG. 5. While two house objects are shown in FIG. 5, it will be appreciated that the number of distinct node objects underneath the house class of FIG. 5 may be more than two. For example, as represented by the "(500)" in FIG. 5, there may be 500 distinct house objects underneath the house class.

As shown in FIG. 5, one or more graphical indicators 510-530 maybe be generated and displayed adjacent to each respective object of the tree diagram. Each graphical indicator may be indicative of a respective visualization property (also referred to as a visualization characteristic) of an associated object. Graphical indicators 510-530 may be generated in the form of distinct icons indicative of a given property or characteristic.

For example, as shown in FIG. 5, graphical indicators 510-530 are displayed adjacent to each house object. Graphical indicator 510 may indicate that the associated object contains one or more children objects. For example, a house object may contain inverter, water heater, and other loads, for example, as described above in connection to FIG. 4. While graphical indicator 510 is shown for both house1 and house2, if an object does not contain any children objects the graphical indicator 510 may not be displayed or an alternative indicator may be displayed (e.g., graphical indicator 510 with a line or "X" through it). Graphical indicator 520 may indicate that the associated object is not displayed in a main map view (e.g., the main map view of FIG. 2). This may be the case if the object is not displayed due to the limit of objects being exceeded (as described herein) and/or that the object itself is a child. In some implementations, the object may be shown in a child map view, as shown in FIG. 4. Graphical indicator 530 may indicate that the associated object is a child object associated with a parent node. For example, as shown in FIG. 5, each house object may be a child of a triplex meter object, as shown in FIG. 4.

Figure 6:
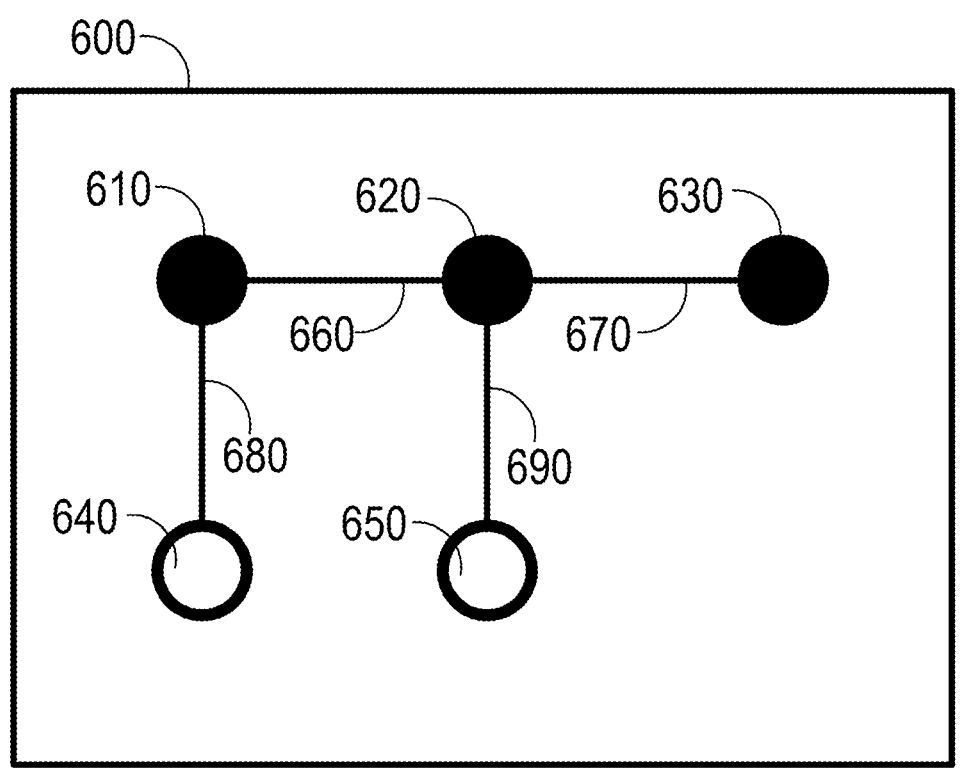
FIG. 6 illustrates an example topology of an example distribution feeder model in a main map view with examples of graphical indicator(s) indicative of child relationship properties of example objects, in accordance with example implementations disclosed herein.

FIG. 6 illustrates an example topology of an example distribution feeder model displayed in a main map view 600 with example graphical indicator(s) indicative of child relationship properties of displayed objects, in accordance with example implementations disclosed herein. In the illustrative example, main map view 600 includes visualizations of a plurality of objects 610-690. Objects 610-650 are examples of node objects connected by link objects 660-690. The main map view 600 may be an illustrative portion of a larger main map view (e.g., the main map views of FIG. 2).

As described above, one or more of the node objects may be associated with one or more children objects. The characteristic or property of containing children objects may be indicated in the main map view 600 by displaying each object using a graphical indicator (or icon) indicative of the characteristics and/or property. For example, objects 610, 620, and 630 may be example node objects that are not associated with any children objects, while objects 640 and 650 may be examples of objects that contain one or more children objects. To indicate that the objects do not contain any children objects, objects 610-630 may be displayed using an icon that does not include an edge or outline (e.g., a solid icon). To indicate that the objects do contain one or more children objects, the objects 640 and 650 may be displayed using an icon having an edge or outline, as illustrated in FIG. 6.

As another example, objects having one or more children objects may be displayed without an edge or outline, while objects not having children objects may be displayed with an edge or outlined (e.g., the reverse of what is shown in FIG. 6). In another example, differently shaped icons (e.g., circular, ovular, square, etc.) may be used in the main map view to indicate respective properties. In some implementations, a first icon may be indicative of no children objects, a second icon indicative of one child object, and a third indicative of a plurality of child objects.

As noted above, the concept of icons described in connection to FIG. 6 may be applied to the various node objects shown in visualization 210 of FIG. 2.

Figure 7:
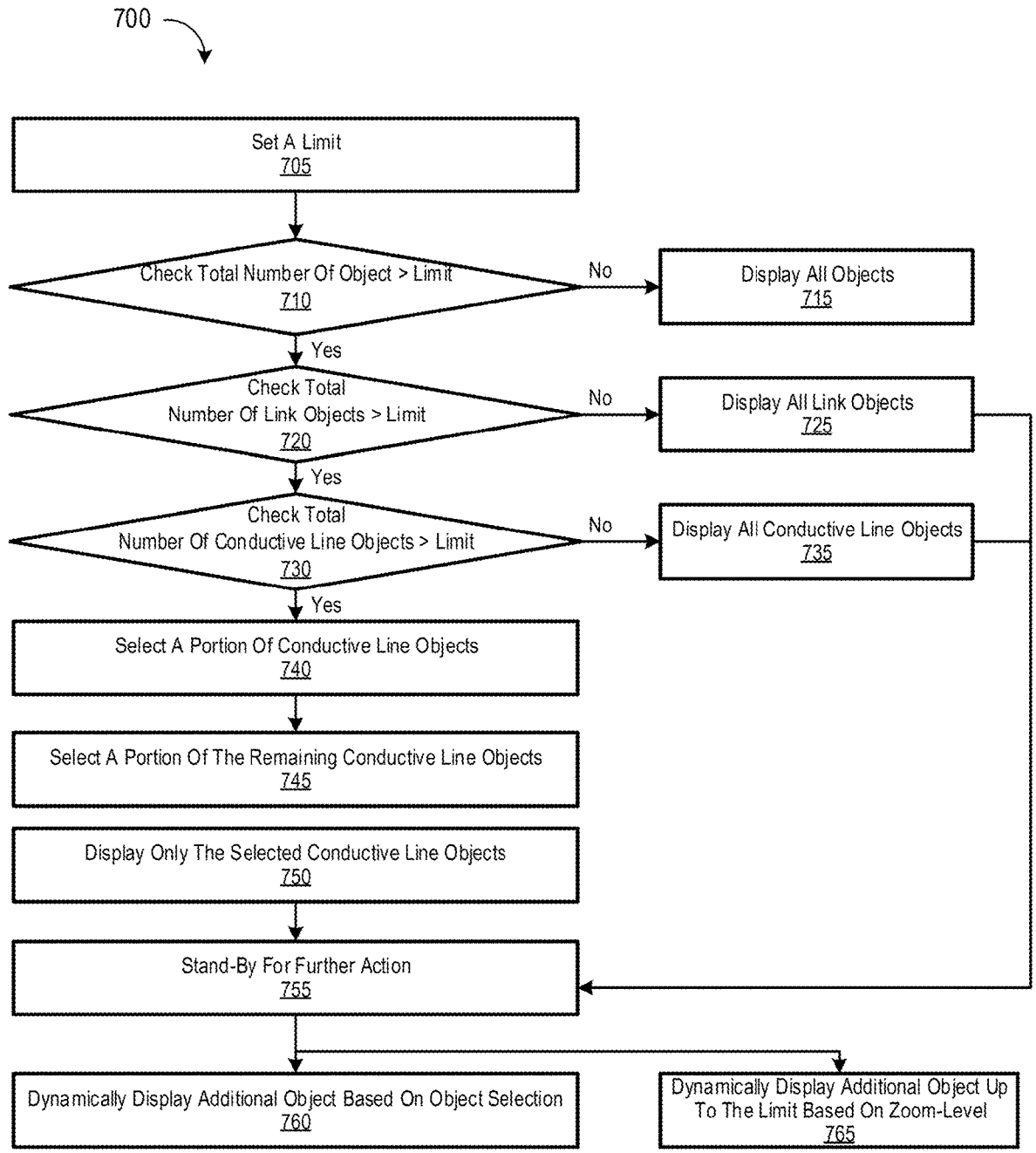
FIG. 7 is a flow diagram illustrating an example distribution system visualization method, in accordance with example implementations disclosed herein.

FIG. 7 is a flow diagram illustrating an example distribution system visualization process 700, in accordance with example implementations disclosed herein. The process 700 may provide an improved user experience and information visualization for use during distribution planning process, for example, via a distribution planning simulation platform. For example, process 700 may provide for limiting the number of objects of a distribution feeder model that are displayed on a main map view of the system, while providing optimal geographic information representation of a feeder model (e.g., as described in connection to FIG. 3). By reducing the number of objects to be displayed, the computation resources are efficiently utilized in displaying the feeder model, without slowdown and/or failure. According to various example implementations, the process 700 may be executed, for example, in a computing environment, such as the computing environment 1500 described in connection with FIG. 15.

Process 700 provides improvements over related art implementations in various ways. For example, with regards to related art implementations utilizing the display of picture tiles, a user may not be able to locate the actual location of an object on the map view. As another example, with regards to related art implementations relying on clustering objects together and displaying as a number, a user may not know the exact location or topology of a distribution feeder model. Both of these above noted approaches are not suitable to a distribution feeder model including grid assets.

Implementations herein are not limited to the particular examples provided and may be extended to other types of objects. For instance, the total number of OH objects may extend to cover other classes of object such as underground line, transmission lines, etc. As noted above, the term conductive lines may be used to refer to one or more classes of link objects, such as but not limited to, OH line objects, underground line objects, transmission line objects, etc. In some implementations, conductive lines may refer to OH line object class only, while in others conductive lines may refer to OH lines and other link object classes based on the various objects included in a respective distribution feeder model to be displayed according to the implementations disclosed herein.

While the following description and reference to the number of objects is based on an example of the distribution feeder model in FIG. 1, it will be appreciated that this reference is for illustrative purposes only. Process 700 may be applied to a distribution feeder model of any number of objects. While the implementations herein are particularly well suited for distribution feeder models having a large number of objects (e.g., 25,000 or more) so to reduce adverse impact on computation resource utilization, the process and methods herein may be applied to any distribution feeder model.

The process 700 starts at step 705, where a limit for number of objects to display on a main map view is set. For example, the limit may be set to 1,250 objects permissible to be displayed on the main map view (e.g., main map described in connection with FIG. 2). The limit may be set based on consideration of computation resources of the system so to minimize performance problems and slowdowns resulting from generating and displaying a significant number of objects. In some implementations, the limit may be set based on consideration of sharing computing resources of a system with other programs and/or browser open and running at the same time as the implementations disclosed herein. For example, sharing of computation resource amongst multiple programs may result in slow downs, necessitating a lower limit.

At step 710, the process 700 determines whether the total number of objects in the distribution feeder model exceeds the limit set at step 705. For example, at step 710 the number of objects contained in the distribution feeder model may be retrieved and/or identified from a database storing the distribution feeder model and the total number of objects may be compared against the set limit. If the total number of objects is less than or equal to the limit set at step 705, the process 700 proceeds to step 715, where all objects are generated and displayed on a main map view (e.g., as described in connection with visualization 210 of FIG. 2). Otherwise, in the case where the total number of objects exceeds the limit set at step 705, the process 700 proceeds to step 720.

At step 720, the process 700 determines whether the total number of link objects contained in the distribution feeder model exceeds the limit set at step 705. For example, at step 720 the total number of link objects is identified and compared against the set limit. If the total number of link objects is less than or equal to the limit set at step 705, the process 700 proceeds to step 725, where all link objects are generated and displayed on a main map view. In some implementations, the main map view displayed following step 725 may not display any node objects, such that only link objects are displayed. In another implementation, the main map view following step 725 may include a number of node objects, such that the total number of objects displayed does not exceed (e.g., less than or equal to) the limit. For example, children objects may not be displayed and a random selection method may be used to select node objects to be displayed. As another example, the nodes objects to be displayed may be customizable. For example, a user may set a priority of node object types, such that higher prioritized node objects are displayed first until the limit is reached (e.g., a user may set load node objects to have a higher priority than capacitor node objects and the process 700 will display load node objects first and then, if the limit is not yet reached, display capacitor objects). In the case where the total number of link objects exceeds the limit set at step 705, the process 700 proceeds to step 730.

At step 730, the process 700 determines whether the total number of conductive line objects exceeds the limit set at step 705. For example, at step 730 the total number of conductive line objects is identified and compared against the set limit. In some implementations, as noted above, conductive line objects may refer to only OH line objects, while in other implementations conductive line objects may refer to a plurality of classes of link objects (e.g., one or more of OH line objects, transmission lines, underground lines, etc.) as desired based on the respective distribution feeder model and the link object classes included therein. In a case where the total number of conductive line objects is less than or equal to the limit set at step 705, the process 700 proceeds to step 735 where all conductive line objects are generated and displayed on a main map view.

If the total number of conductive line objects exceeds the limit set at step 705, the process 700 selects one or more subsets of the conductive line objects identified at step 730 based on one or more conditions related to the conductive lines, and generates the main map view displaying a visualization of the distribution feeder model topology using the one or more subsets of the conductive lines. For example, the one or more conditions may be a plurality of conditions, each condition different from each other and configured to select one or more subsets of conductive line objects that are representative of the overall topology of the distribution feed model (e.g., as described in connection to FIG. 3).

For example, where the process determines the number of conductive line objects exceeds the limit at step 735, the process 700 proceeds to step 740. At step 740, the process 700 selects a first subset (also referred to as a first portion) of the conductive line objects identified at step 730 based on a first condition related to the conductive lines. For example, the distribution feeder model under consideration in process 700 may contain main conductive line objects with longer sections as a backbone of the system and lateral conductive line objects with shorter sections to cover wider area toward the end of the feeder model. At step 740, according to some examples, the process 700 may select a small portion (e.g., subset) of conductive line objects that represent the most of the overall topology of the distribution feeder model, for example, an amount of the accumulated length of the distribution feeder model that is representative of the overall topology. For example, the first condition may be set to select the top 10% longest length conductive line objects relative to the remaining conductive lines, such that the first subset of conductive line objects selected at step 740 are only those top 10%. That is, the conductive line objects may be ordered according to their respective lengths (e.g., as shown by plot 310 of FIG. 3) and the top 10% of the conductive line objects may be selected at step 740.

For example, the distribution feeder model from FIG. 1 contains a total of 2,500 Oil objects. The process 700 may select the top 10% (e.g., top 250 OH objects) with the longest length relative to the remaining 01 lines at step 740. As shown in FIG. 3, plot 320 shows that this 10% of OH objects represents 30% of accumulated length of all OH objects.

While 10% of conductive line objects having the longest relative length is used herein as an example, other criteria may be utilized. For example, the first condition may be to select the top 20%, 30%, etc., of conductive line objects that may be used. As another example, the first condition may be based on selecting all of a first phase conductive line objects before second phase conductive line objects (e.g., selecting all of 3 phases conductive line objects before single phase conductive line objects). As yet another example, the first condition may be based on selecting all of conductive line objects corresponding to a first voltage level before conductive line objects corresponding to a second voltage level (e.g., selecting all conductive line objects corresponding to 25 kV before conductive line objects corresponding to 12 kV).

The process 700 may then proceed to step 745, where the process selects a second subset (e.g., second portion) of the remaining conductive line objects. Step 745 may be configured to select a portion of the remaining conductive line objects to cover wider area toward the end of the feeders (e.g., a portion of the conductive lines having smaller lengths which tend to be located toward the end of the distribution feeder model). At step 745, the process 700 may select a number of the remaining conductive line objects up to the limit set at step 705 object.

Selection at step 745 from the remaining conductive line objects may be based on a second condition. The second condition may be different from the first condition. For example, the second condition may be a random selection method, whereby the conductive line objects for the second portion are randomly selected from the remaining conductive line objects. Additional examples for the second condition are described in connection with FIG. 8.

As an illustrative example with reference to the example distribution feeder model of FIG. 1, the distribution feeder model contains a total of 2,500 OH objects. From step 740, 10% of the 2,500 OH objects is 250 OH objects (e.g., an example of a first subset of the conductive line objects). At step 745, the process selects 1.000 objects from remaining OH objects (e.g., an example of a second subset of conductive line objects), based on the limit of 1250 objects set at step 705 and the 250 OH objects selected step 740. At step 745, the 1,000 objects may be selected by, but not limited to, the random selection method.

In some implementations, step 745 may utilize a second condition related to the conductive line objects to select the subset of the remaining conductive line objects. For example, second condition may be a percentage of the remaining conductive line objects having relatively longer lengths. In some implementations, step 745 may include one or more steps of selecting from the remaining conductive line objects based on one or more conditions related to the conductive line objects followed by a random selection method step to meet the limit. In another example, the second condition may be based on phase of the conductive line objects or voltage levels.

In another example, the first condition may be based on a phase of the conductive line objects and the second condition may be based on length or voltage level. Similarly, the first condition may be based on voltage level and the second condition based on length or phase.

Once the one or more subsets of conductive line objects are selected at steps 740 and/or 745, the process 700 proceeds to step 750 where only the selected subsets of conductive line objects are displayed in a main map view. From the above example referring to FIG. 1, the total number of OH objects (e.g., 2,500 OH objects) exceeds the limit set at step 705, which is set at 1,250 objects in this example. At step 740, the process 700 selects 250 OH objects based on the first condition and, at step 745, the process 700 selects 1,000 OH objects based on the second condition. Thus, the one or more subsets of OH objects selected by the process 700 is at the limit set at step 705. The process 700 then displays the 1,250 OH objects in a main map view at step 750, which is representative of the topology of the distribution feeder model (e.g., 30% from the first subset plus topology represented by the second subset).

The combination of the subsets selected at steps 740 and 745 allows a system with limited resources to display both (1) information in terms of accumulated length aspects and (2) wide area location aspects of a feeder model on a main map view optimally, without slowdown or system failure.

Following steps 715, 725, 735, or 750, the visualization of the distribution feeder model topology in the main map view may represent the whole (e.g., entirety) feeder view. This view may be representative of the entire geographic service area corresponding to the distribution feeder model.

In some example implementations, the process 700 may include optional step 755, where the process is configured to stand-by for further input action from a user of the computing environment on which process 700 is executed. During step 755, the computing environment may generate and display the visualization of the main map view based, for example, on steps 710-750. That is, for example, where the limit is not exceeded at step 720, the main map view may display all link objects; where the limit is not exceeded at step 730, the main map view displays all conductive line objects, and otherwise the main map view displays the distribution feeder model based on the one or more subsets of conductive line objects from steps 740 and 745. The whole service area of the distribution feeder model may also be displayed, either in combination or separately.

The process 700 may also include optional step 760, where process 700 dynamically displays additional objects based on a selection of an object. For example, user input may select one or more objects from a visualization, separate from the main map view (e.g., the tree diagram of FIG. 1). The selected object(s) may not be currently displayed on the main map view. Based on receiving the object selection, process 700 may dynamically update the main map view to display the selected object(s). In some implementations, the last one or more link objects added to the subset at step 745 may be removed from the main map view in response to adding the selected object(s), such that the total number of objects displayed in the main map view is maintained at the limit set at step 705. In another example, the selected object(s) may be added while continuing to display all objects displayed in the main map view prior to adding the selected object(s). In some implementations, the selected object(s) may be displayed and highlighted in the main map view to assist pinpoint location of the selected object(s) on the main map view. In another implementation, either alone or in combination, the selected object(s) may be hidden on the main map view after a certain time period (e.g., 5 minutes or other desired time period), so as to limit the resource utilization required to display the selected object. The time period may be set by the user in a setting menu.

The process 700 may also include optional step 765, where the process 700 dynamically displays additional objects up to the limit set in step 705 in response to changes in zoom level. For example, user input may request a zoom-in operation to view a portion of the geographical area of the distribution feeder model topology. At step 765, the process 700 may unload (e.g., unselect and remove from generation and display) one or more objects that are not in a current viewing area (e.g., viewport or window) of the main map view, such that the unloaded objects are no longer necessary for the visualization that is generated. Additionally, in some implementations, the process 700 may dynamically display additional objects not previously displayed in the whole feeder view level from step 725, 735, or 750. The total number of objects in the zoomed in visualization is limited by the limit set in step 705, such that for any zoom-in operation the number of objects viewed does not exceed the limit. Additional details of the zoom-in operation are described below in connection to FIG. 12.

Figure 8:
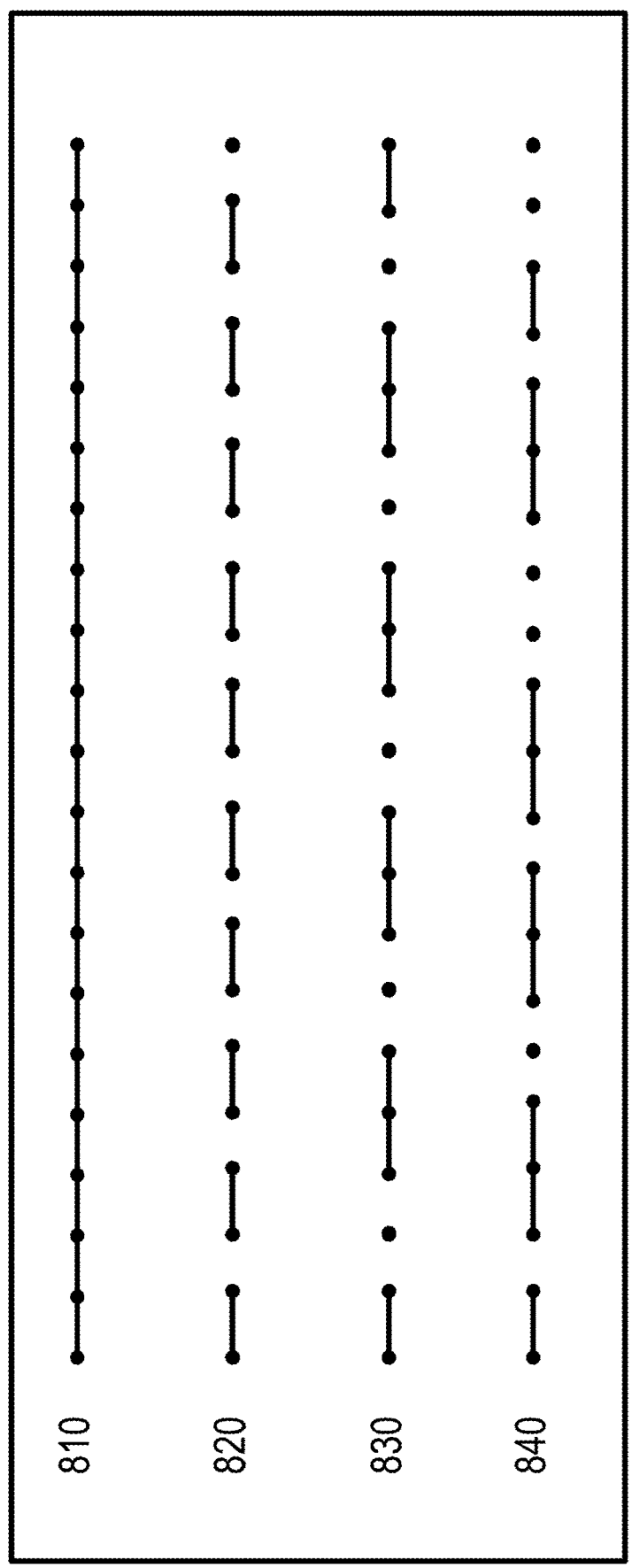
FIG. 8 illustrates example methods of selecting a subset of conductive line objects, in accordance with example implementations disclosed herein.

FIG. 8 illustrates example methods of selecting a subset of conductive line objects, in accordance with example implementations disclosed herein. For example, FIG. 8 may illustrate examples of approaches for implementing in step 745. As noted above, step 745 may include selecting a second subset of conductive line objects based on a second condition. FIG. 8 illustrates example conditions, illustratively shown as schematics 820-840, that may be used as the second condition for selecting conductive line objects at step 745.

For example, schematic 810 illustrates an example of 20 conductive line objects. For illustrative purposes, the 20 conductive line objects may be considered the remaining conductive line objects following step 740. Schematic 820 illustrates an example condition where every other conductive line object is selected, resulting in a selection of 10 conductive line objects. Schematic 830 illustrates an example of selecting every other two conductive line objects, resulting in selection of ten conductive line objects. Schematic 840 illustrates an example of selection of 10 conductive line objects using a random selection method.

Figure 9:
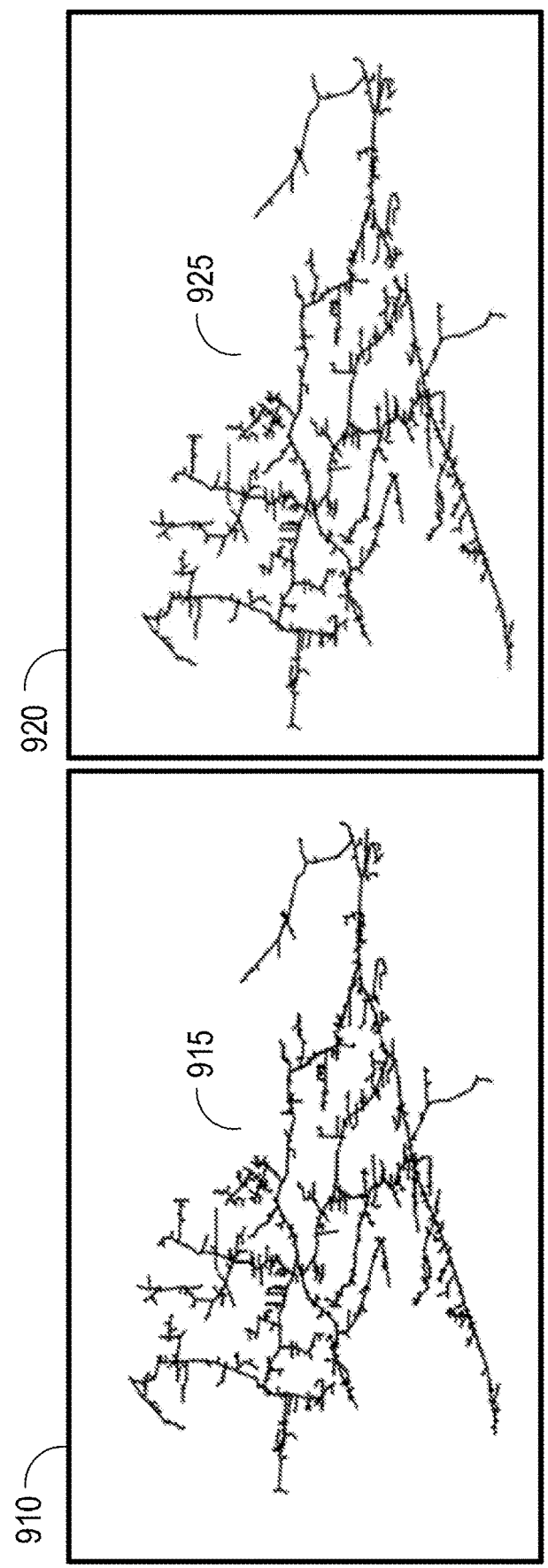
FIG. 9 illustrates example visualizations of the topology of the distribution feeder model of FIG. 1 in main map views displaying link objects, in accordance with example implementations disclosed herein.

FIG. 9 illustrates example visualizations 915 and 925 of the topology of the distribution feeder model of FIG. 1 in main map views 910 and 920 displaying link objects, in accordance with example implementations disclosed herein. FIG. 9 is an example for a system with limited resources that may not respond efficiently when displaying all objects of an example of the distribution feeder model in FIG. 1, as shown in visualization 210 of FIG. 2.

Main map view 910 illustrates an example visualization 915 displaying all 5,000 link objects of the distribution feeder model of FIG. 1. In this case, the limit set by a user at step 705 of FIG. 7 for visualization 915 is 5,000 objects. The total number of objects displayed in visualization 915 is a combination of 2,500 overhead line objects and 2,500 of other link objects such as regulator, switch, transformer, and triplex line objects. Thus, in this example, visualization 915 displays only link objects.

Main map view 920 illustrates an example visualization 925 displaying 2,500 link objects of the distribution feeder model of FIG. 1. In this case, the limit at step 705 may have been set to 2,500 objects. Thus, the total number of objects may be 2,500 overhead line objects.

In main map views 910 and 920, the information displayed by both visualization 915 and visualization 925 are quite similar; however, the system resource utilization for visualization 925 is much smaller than that of visualization 915 since visualization 925 contains half the number of objects to be generated and displayed as compared to visualization 915.

At a whole feeder view (e.g., entirety of the topology), both visualization 915 and visualization 925 may function as good representations of the entire feeder topology as compared to the visualizations of FIG. 2.

Figure 10:
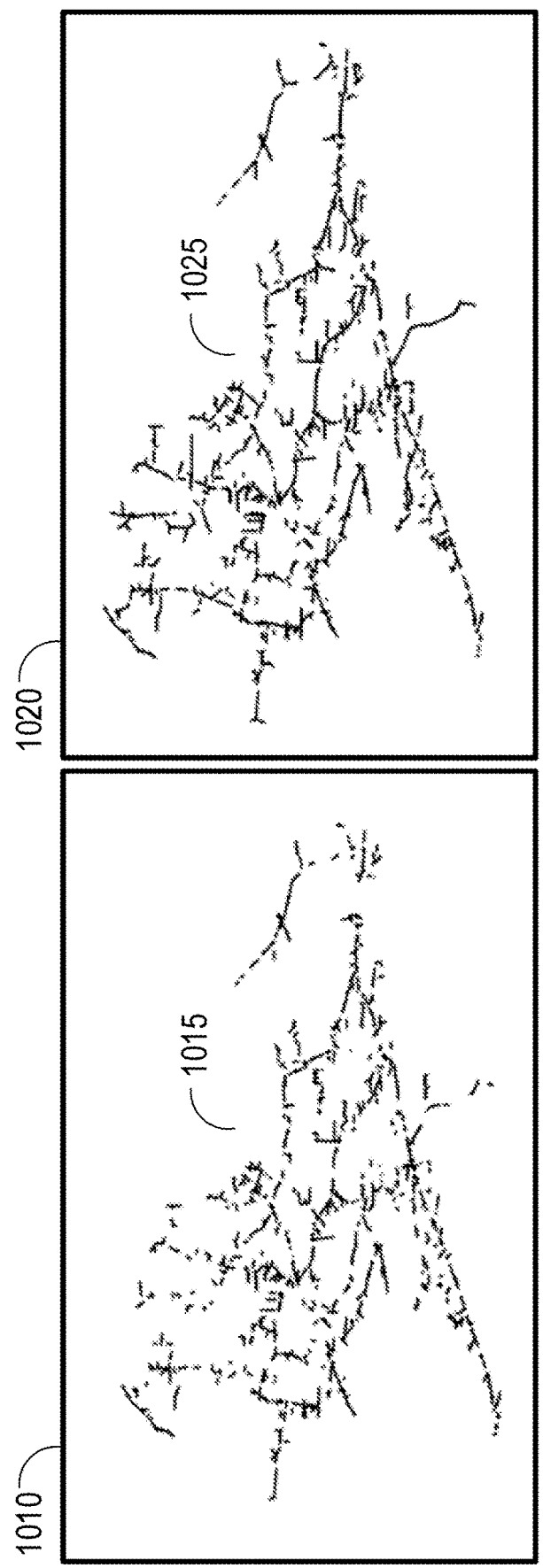
FIG. 10 illustrates example visualizations of the topology of the distribution feeder model of FIG. 1 in main maps view displaying 50% of conductive line objects, in accordance with example implementations disclosed herein.

FIG. 10 illustrates example visualizations 1015 and 1025 of the topology of the distribution feeder model of FIG. 1 in main map views 1010 and 1020 displaying 50% of conductive line objects, in accordance with implementations disclosed herein. The example visualizations of FIG. 10 are examples that utilize fewer system resources than the example visualizations of FIG. 9. For example, the limit set at step 705 for generating the visualizations 1015 and 1025 of FIG. 10 may be 1,250 objects.

Main map view 1010 illustrates an example visualization 1015 of the distribution feeder model of FIG. 1 displaying 50% of conductive line objects using a random selection method to select the displayed objects.

Main map view 1020 illustrates an example visualization 1025 of the distribution feeder model of FIG. 1 displaying 50% of conductive line objects according to implementations disclosed herein. For example, visualization 1025 illustrates a combination of step 740 (e.g., the top 10% of the longest length conductive line objects as the first condition) and step 745, where the second condition is a random selection method of the remaining conductive line objects.

Both visualization 1015 and visualization 1025 contain 1,250 conductive line objects, but visualization 1025 clearly provides more detailed information of accumulated length of the distribution feeder model than that of visualization 1015.

Figure 11:
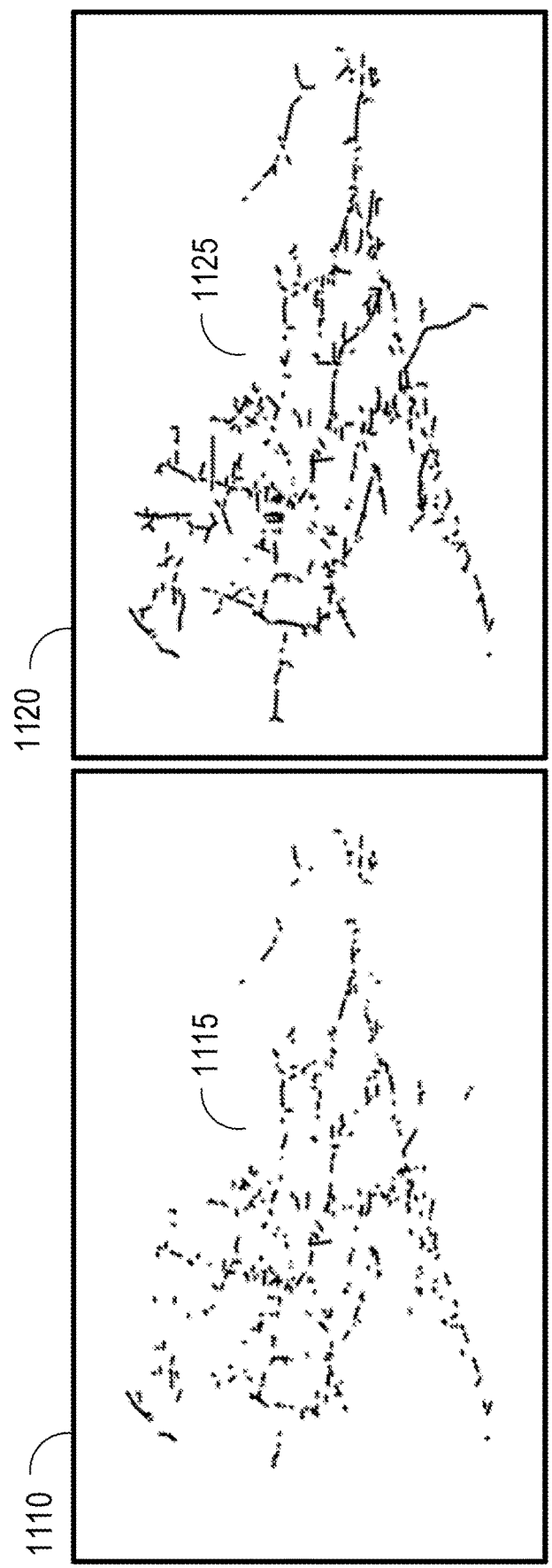
FIG. 11 illustrates example visualizations of the topology of the distribution feeder model of FIG. 1 in main map view displaying 25% of conductive line objects, in accordance with example implementations disclosed herein.

FIG. 11 illustrates example visualizations 1115 and 1125 of the topology of the distribution feeder model of FIG. 1 in main map views 1110 and 1120 displaying 25% of overhead line, in accordance with example implementations disclosed herein. The example visualizations of FIG. 11 are examples that utilize fewer system resources than the example visualizations of FIGS. 9 and 10. For example, the limit set at step 705 for generating the visualizations of FIG. 11 may be 625 objects.

Main map view 1110 illustrates an example visualization 1115 of the distribution feeder model of FIG. 1 displaying 25% of conductive line objects using a random selection method to select displayed objects.

Main map view 1120 illustrates an example visualization 1125 of the distribution feeder model of FIG. 1 displaying 25% of conductive line objects according to implementations disclosed herein. For example, visualization 1120 illustrates a combination of step 740 (e.g., the top 10% of the longest length conductive line objects as the first condition) and step 745, where the second condition is a random selection method of the remaining conductive line objects.

Both visualization 1115 and visualization 1125 contain 625 conductive line objects, but visualization 1125 clearly provides more detailed information of accumulated length of the distribution feeder model than that of visualization 1115.

Figure 12:
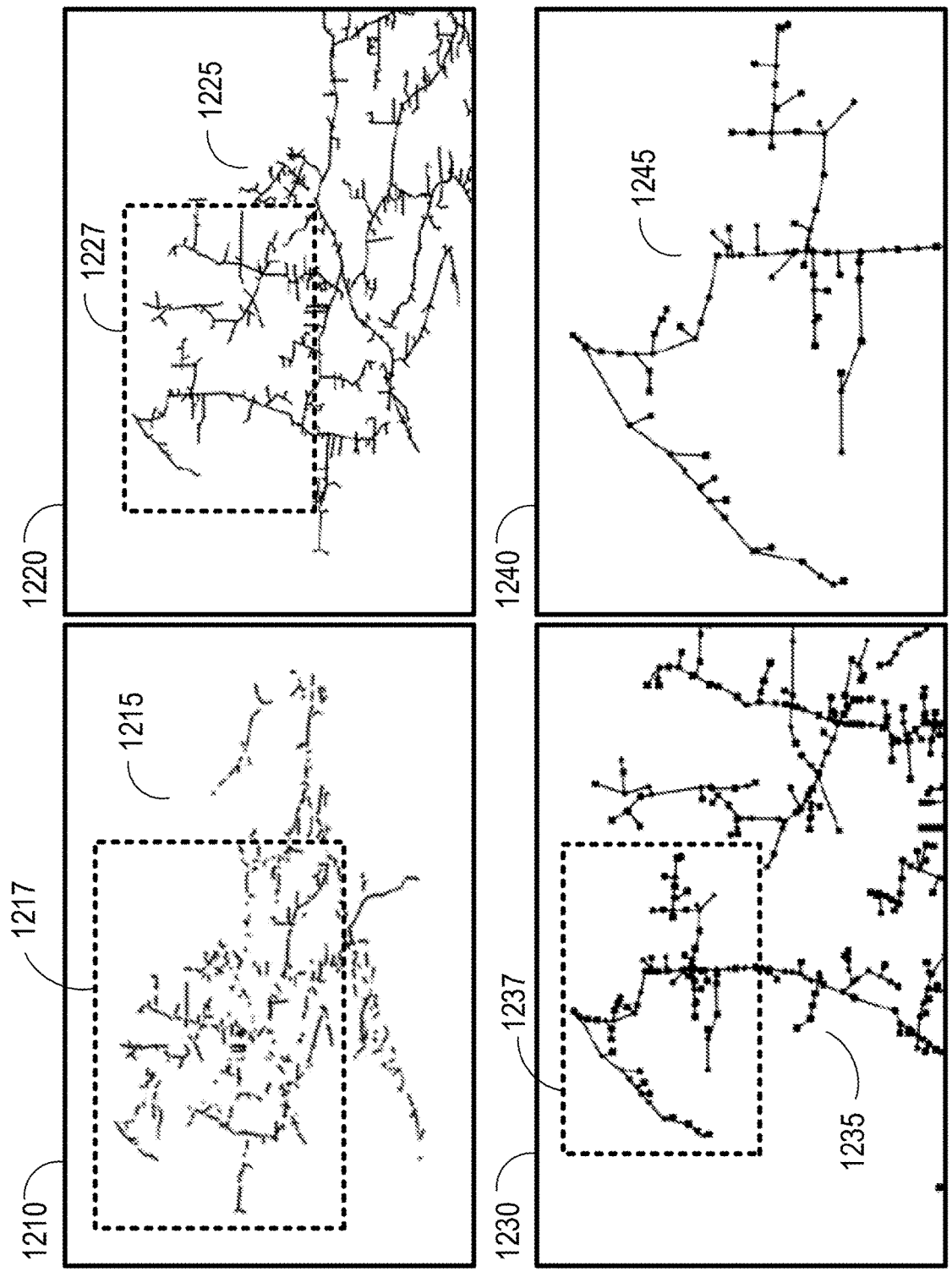
FIG. 12 illustrates visualizations of the topology of the distribution feeder model of FIG. 1 in a main map view at different zoom levels, in accordance with example implementations disclosed herein.

FIG. 12 illustrates visualizations 1215, 1225, 1235, and 1245 of example main map views 1210, 1220, 1230, and 1240 at different zoom levels, in accordance with example implementations disclosed herein. For example, FIG. 12 illustrates example visualizations at different zoom levels of the main map displayed according to step 765 of FIG. 7.

For illustrative purposes only, the visualization 1215 is similar to visualization 1125 of FIG. 11. Visualization 1215 illustrates the example distribution feeder model topology displayed using 25% of the conductive line objects with the method according to the implementations disclosed herein. That is, visualization 1215 illustrates a combination of step 740 (e.g., the top 10% of the longest length conductive line objects as the first condition) and step 745, where the second condition is a random selection method of the remaining conductive line objects. A dotted rectangle 1217 is shown in main map view 1210 indicating an area of the topology to be zoomed into, thus defining a zoom-in level. The zoom-in operation may be in response to a user input, for example, following the stand-by step 755 of FIG. 7. Visualization 1225 illustrates the resulting visualization following the zoom-in operation defined by box 1217.

Visualization 1225 illustrates a portion of the topology of visualization 1215 following the zoom-in action, where the topology displayed by visualization 1225 corresponds to the portion defined by box 1217. The computing environment dynamically updates the main map view 1220 by unloading unnecessary objects and adding new objects to be displayed. Thus, the visualization 1225 displays additional objects up to the limit, while unloading objects displayed in visualization 1210 that are now outside of the zoomed-in visualization 1225 displayed in main map view 1220. In an illustrative example, the additional objects added to the visualization 1225 may be link objects, such that link objects that were not included in visualization 1215 are now added, while previously selected link objects are removed. In an example, objects to be added may be selected by the method described in connection to FIG. 8. As another example, objects to be added may be selected according to length as described herein (e.g., step 740 of FIG. 7). The link objects added to the displayed visualization provide additional details of the zoomed-in topology, while avoiding adverse impact to system performance and resource utilization.

Visualization 1235 illustrates another zoom-in action where the geographic area displayed corresponds to box 1227 of main map view 1220. In this illustrative example, the main map view 1230 is dynamically updated by adding additional objects to the visualization 1235 while removing objects from visualization 1225 that are outside of the main map view 1230. In this case, link objects and/or node objects are added, up to the limit, and unneeded link objects outside of the main map view 1230 are unloaded. Thus, the system displays additional link and/or node objects on the main map view, while avoiding adverse impact to system performance and resource utilization. As noted above, any of the methodologies disclosed herein may be utilized to add additional objects to the main map view.

Visualization 1245 illustrates a zoom-in action, where the geographic area displayed corresponds to box 1237 of main map view 1230. In this illustrative example, additional objects are not added because the previous visualization (e.g., in this case visualization 1235) may have already displayed all link and node objects of the distribution feeder model.

Figure 13:
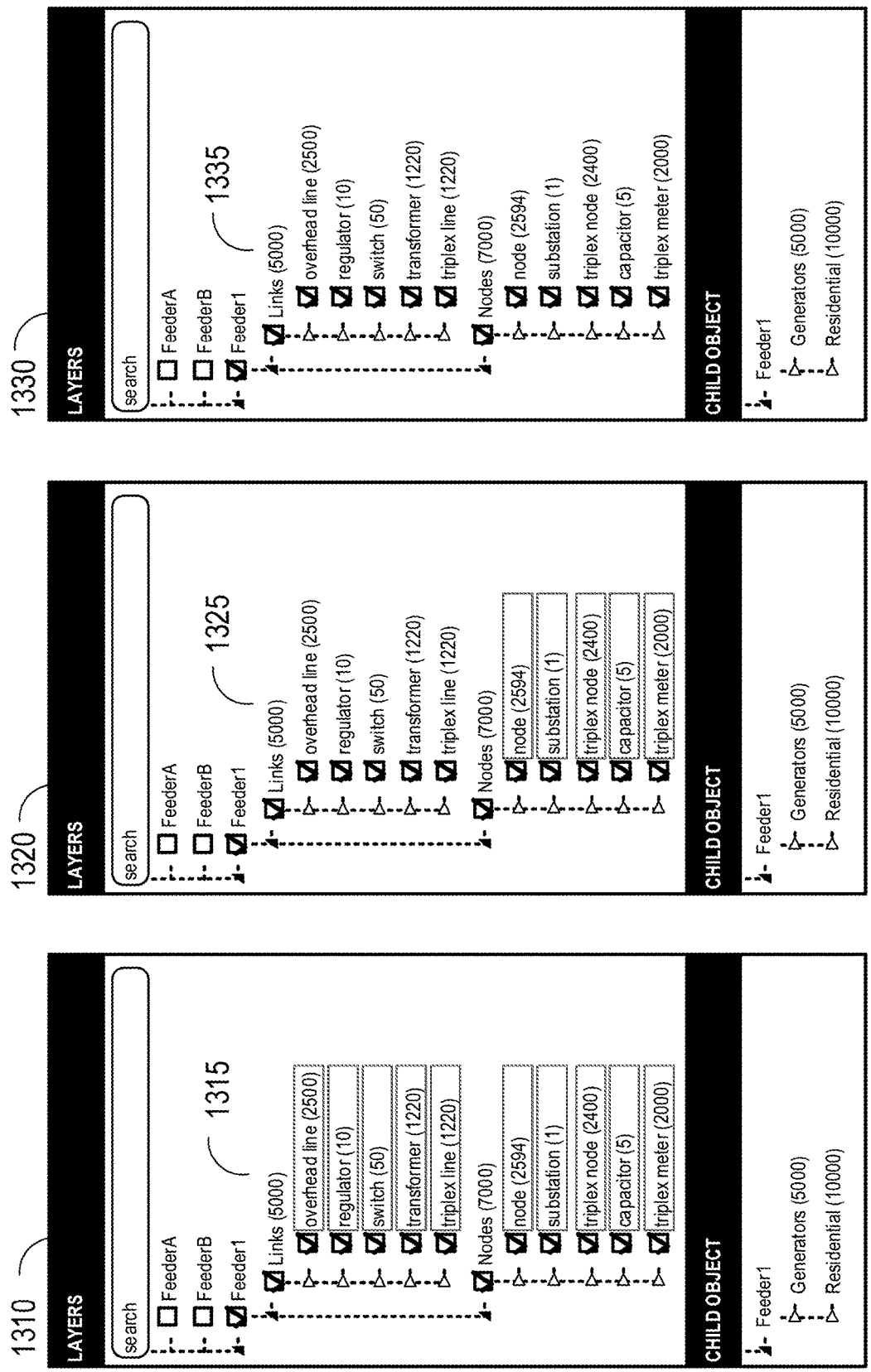
FIG. 13 illustrates example visualizations of the distribution feeder model of FIG. 1 in the form of tree diagrams with example graphical indicators of display status of object classes in a main map view, in accordance with example implementations disclosed herein.

FIG. 13 illustrates example visualizations 1310, 1320, and 1330 of the distribution feeder model of FIG. 1 in the form of tree diagrams 1315, 1325, and 1335 including example graphical indications indicative of display status of object classes in a main map view, in accordance with example implementations disclosed herein. For example, FIG. 13 illustrates highlight boxes generated for one or more object classes, where each box is indicative of a display status, with respect to the separately displayed main map view, of the respective object class.

For example, each box may indicate that not all objects of an associated object class are displayed in a main map view. In this scenario, tree diagram 1315 illustrates status of objects for main map view 1210, where 25% (e.g., 625 conductive line objects) are displayed in the visualization 1215. Tree diagram 1325 illustrates status of objects for main map view 1220, where all link objects are dynamically displayed by the visualization 1225. However, none of the node objects are shown since inclusion of such would be over the limit. Tree diagram 1335 illustrates status of objects for main map view 1240, where all link and node objects are dynamically displayed by the visualization 1245.

While highlighted boxes as illustratively shown in FIG. 13, it will be appreciated that any graphical indicator may be generated and used to indicate object class display status/properties. For example, the graphical indicators may be circular, ovular, etc. As another example, the text of the object class may be displayed in a contrasting manner relative to other text, such as, but not limited to, bold type, italic type, differing fonts, larger or smaller fonts, etc. As yet another example, an icon may be provided adjacent to the object class text indicating the status.

System Environment

Figure 14:
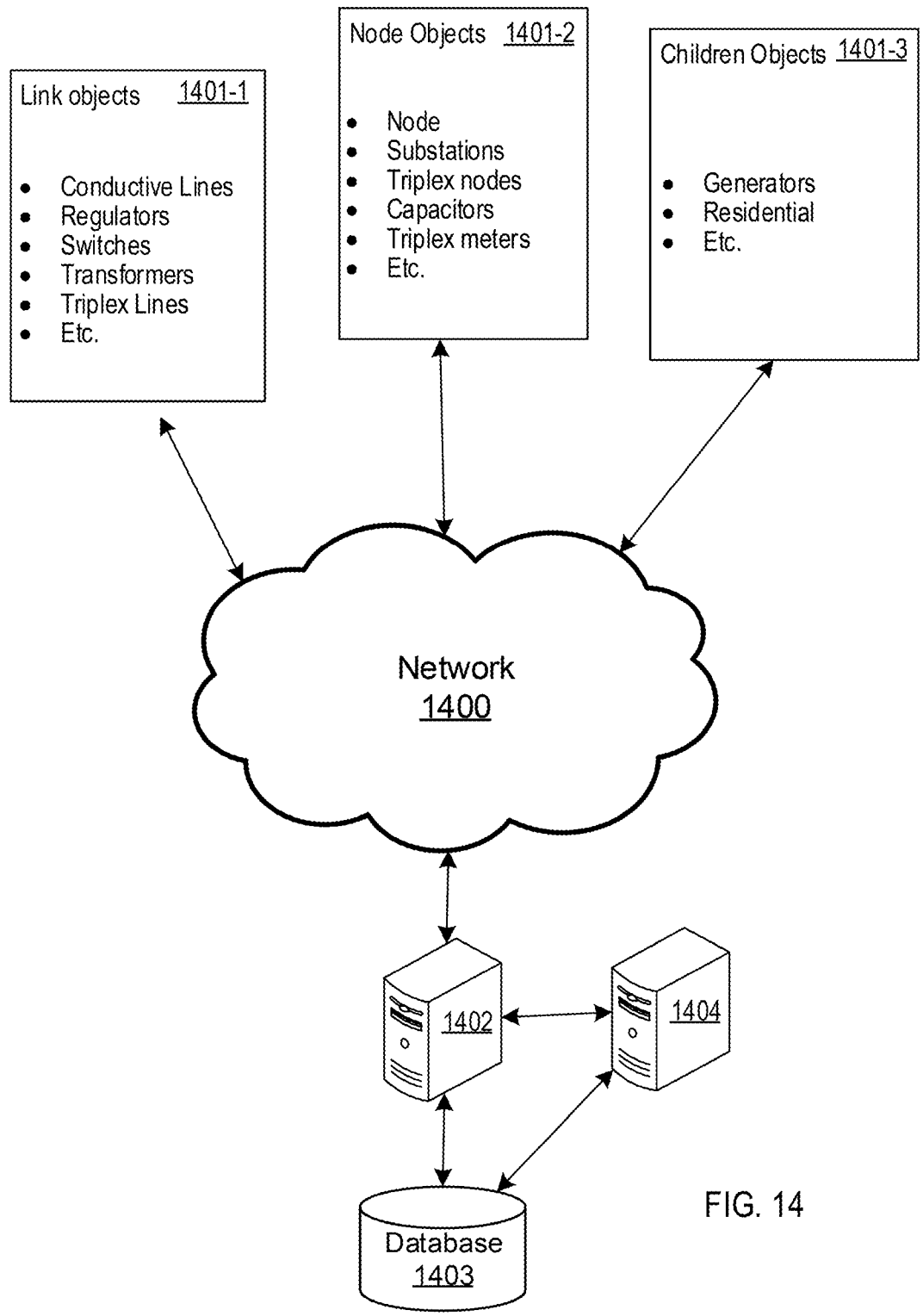
FIG. 14 illustrates a system involving one or more equipment and a management apparatus, in accordance with an example implementation.

FIG. 14 illustrates a system involving one or more node objects and one or more link objects of a distribution feeder model, and distribution planning simulation platform utilizing a power distribution network visualization system configured to manage and generate visualizations of the distribution feeder model, in accordance with an example implementation. In some implementations, link objects 1401-1, node objects 1401-2, and children objects 1401-3 are communicatively coupled to a network 1400 which is connected to the distribution planning simulation platform 1402, which comprises or is otherwise communicatively coupled (e.g., via wired or wireless communication) to the power distribution network visualization system 1404. In another implementation, the system stores link objects 1401-1, node objects 1401-2, children objects 1401-3, and geographical information in database 1403. To upload data to the database 1403, the data may be uploaded for storage in the database 1403 via network 1400 through a power distribution network visualization system 1404 of the system 1402 and store in database 1403. The distribution planning simulation platform 1402 may be utilized for distribution planning process, which may utilize the visualizations and methodologies disclosed herein performed by the power distribution network visualization system 1404.

The power distribution network visualization system 1404 and distribution planning simulation platform 1402 access a database 1403, which contains historical data, geographical information, and children relationship information collected from the distribution feeder model in the network 1400. In alternate example implementations, the data for the objects 1401-1, 1401-2, and 1401-3 can be stored to a central repository or central database such as proprietary databases such that power distribution network visualization system 1404 and/or distribution planning simulation platform 1402 can access or retrieve the data from the central repository or central database. As described herein, each of the objects may be associated with a geographic location, wherein the power distribution network visualization system 1404 maintains information managing and visualizing the one or more objects of the power distribution feeder model by the power distribution network visualization system 1404 according to associated geographical locations.

Computing Environment

FIG. 15 illustrates an example computing environment with an example computer device suitable for use in some example implementations, such as a power distribution network visualization system 1404 and/or the distribution planning simulation platform 1402 of FIG. 14. Computer device 1505 in computing environment 1500 can include one or more processing units, cores, or processors 1510, memory 1515 (e.g., RAM, ROM, and/or the like), internal storage 1520 (e.g., magnetic, optical, solid-state storage, and/or organic), and/or L/O interface 1525, any of which can be coupled on a communication mechanism or bus 1530 for communicating information or embedded in the computer device 1505. I/O interface 1525 is also configured to receive images from cameras or provide images to projectors or displays, depending on the desired implementation. For example, I/O interface 1525 may be configured to provide image data to a projector and/or display to generate and display the visualizations disclosed herein (e.g., the visualizations as described in connection with FIGS. 1, 2, 4-6 and 8-12).

Computer device 1505 can be communicatively coupled to input/user interface 1535 and output device/interface 1540. Either one or both of the input/user interface 1535 and output device/interface 1540 can be a wired or wireless interface and can be detachable. Input/user interface 1535 may include any device, component, sensor, or interface, physical or virtual, that can be used to provide input (e.g., buttons, touch-screen interface, keyboard, a pointing/cursor control, microphone, camera, braille, motion sensor, optical reader, and/or the like). For example, the input/user interface 1535 may provide an interface and a means for receiving inputs from users, for example, such as user inputs for performing steps 755 and/or 760 of FIG. 7. The input/user interface 1535, according to some embodiments, may be a means for receiving a limit of objects to be displayed on a main map view, according to some implementations. Output device/interface 1540 may include a display, television, monitor, printer, speaker, braille, or the like. In some example implementations, input/user interface 1535 and output device/interface 1540 can be embedded with or physically coupled to the computer device 1505. In other example implementations, other computer devices may function as or provide the functions of input/user interface 1535 and output device/interface 1540 for a computer device 1505. Output device/interface 1540 may be configured to receive image data, for example, from I/O interface 1525 and display images based on the image data to display the visualizations disclosed herein (e.g., the visualizations as described in connection with FIGS. 1, 2, 4-6, and 8-12). According to some implementations, the I/O interface 1525 may be a means for generating one or more of the visualizations disclosed herein (e.g., in connection with any one or more of FIGS. 1, 2, 4-6, and 8-12) and a display and/or projector may be a means for displaying the visualizations.

Examples of computer device 1505 may include, but am not limited to, highly mobile devices (e.g., smartphones, devices in vehicles and other machines, devices carried by humans and animals, and the like), mobile devices (e.g., tablets, notebooks, laptops, personal computers, portable televisions, radios, and the like), and devices not designed for mobility (e.g., desktop computers, other computers, information kiosks, televisions with one or more processors embedded therein and/or coupled thereto, radios, and the like).

Computer device 1505 can be communicatively coupled (e.g., via I/O interface 1525) to external storage 1545 and network 1550 for communicating with any number of networked components, devices, and systems, including one or more computer devices of the same or different configuration. Computer device 1505 or any connected computer device can be functioning as, providing services of, or referred to as a server, client, thin server, general machine, special-purpose machine, or another label.

I/O interface 1525 can include but is not limited to, wired and/or wireless interfaces using any communication or I/O protocols or standards (e.g., Ethernet, 802.11x, Universal System Bus, WiMax, modem, a cellular network protocol, and the like) for communicating information to and/or from at least all the connected components, devices, and networks in computing environment 1500. Network 1550 can be any network or combination of networks (e.g., the Internet, local area network, wide area network, a telephonic network, a cellular network, satellite network, and the like).

Computer device 1505 can use and/or communicate using computer-usable or computer readable media, including transitory media and non-transitory media. Transitory media includes transmission media (e.g., metal cables, fiber optics), signals, carrier waves, and the like. Non-transitory media includes magnetic media (e.g., disks and tapes), optical media (e.g., CD ROM, digital video disks, Blu-ray disks), solid-state media (e.g., RAM, ROM, flash memory, solid-state storage), and other non-volatile storage or memory.

Computer device 1505 can be used to implement techniques, methods, applications, processes, or computer-executable instructions in some example computing environments. Computer-executable instructions can be retrieved from transitory media, and stored on and retrieved from non-transitory media. The executable instructions can originate from one or more of any programming, scripting, and machine languages (e.g., C, C++, C#, Java, Visual Basic, Python, Perl, JavaScript, and others).

Memory 1515 can be configured to store one or more programs, such as Operating System (OS), Hypervisor, and applications. Memory 1515 may be configured to store instructions for executing a power distribution network visualization process, such as process 700 of FIG. 7. One or more of internal storage 1520 and external storage (if applicable) may be configured to store information of the power distribution feeder model of FIG. 1, including information pertaining to the objects contained therein.

Processor(s) 1510 can execute under any operating system (OS) (not shown), in a native or virtual environment. One or more applications can be deployed that include logic unit 1560, application programming interface (API) unit 1565, input unit 1570, output unit 1575, and inter-unit communication mechanism 1595 for the different units to communicate with each other, with the OS, and with other applications (not shown). The described units and elements can be varied in design, function, configuration, or implementation and are not limited to the descriptions provided. Processor(s) 1510 can be in the form of hardware processors such as central processing units (CPUs) or in a combination of hardware and software units.

Processor(s) 1510 can be in the form of physical hardware processors (e.g., Central Processing Units (CPUs), fieldprogrammable gate array (FPGA), application-specific integrated circuit (ASIC)) or a combination of software and hardware processors.

Processor(s) 1510 can be configured to fetch and execute programs stored in memory 1515. When processor(s) 1510 execute programs, processor(s) 1510 fetch instructions of the programs from memory 1515 and execute them, such as programs for performing process 700 illustrated in FIG. 7. When processor(s) 1510 execute programs, processor can load and unload information such as information defining the power distribution feeder model and the objects therein, as in FIGS. 1, from memory. Processor(s) 1510 can pre-fetch and cache instruction of programs and information to improve performance.

In some example implementations, when information or an execution instruction is received by API unit 1565, it may be communicated to one or more other units (e.g., logic unit 1560, input unit 1570, output unit 1575). In some instances, logic unit 1560 may be configured to control the information flow among the units and direct the services provided by API unit 1565, the input unit 1570, the output unit 1575, in some example implementations described above. For example, the flow of one or more processes or implementations may be controlled by logic unit 1560 alone or in conjunction with API unit 1565. The input unit 1570 may be configured to obtain input for the calculations described in the example implementations, and the output unit 1575 may be configured to provide an output based on the calculations described in example implementations.

Processor(s) 1510 can be configured to set a limit of objects of a power distribution network to be displayed on a map, the objects comprising at least nodes and links between the nodes, the links comprising at least conductive lines; and when the total number of the objects exceeds a limit, select one or more subsets of the conductive lines based on one or more conditions related to the conductive lines, and generating a first visualization displaying the map comprising a subset of the objects including the one or more subsets of the conductive lines. Where a number of displayed objects is less than or equal to the limit, as illustrated in FIG. 7. In some examples, the one or more events may be stored in a storage device, such as internal storage 1520, memory 1514, external storage 1545, etc. In various example implementations, the processor(s) 1510 (or the components therein) may be an example of means for setting a limit of objects to be displayed on a main map view, for example, based on user input via the input/user interface 1535. The processor(s) 1510 (or the components therein) may also be an example means for, when the total number of objects exceeds a limit, selecting one or more subsets of conductive lines based on one or more conditions related to the conductive lines. Furthermore, the processor(s) 1510 (or the components therein) may also be an example means for generating visualizations of the power distribution network, for example, by generating information to be provided by the I/O interface 1525 to a display and/or projector that displays the visualization.

In example implementations, processor(s) 1510 may be configured to select a plurality of subsets of the conductive lines based on a plurality of conditions related to the conductive lines; and display only the plurality of subsets of the conductive lines. For example, processor(s) 1510 may be configured to select a first subset of the conductive lines based on a first condition related to the conductive lines; select a subset of the remaining conductive lines based on a second condition; and display at least the first and second subsets. In some implementations, the first condition is different than the second condition, and may be based on relative lengths of the conductive lines. In some implementations, the second condition is a random selection algorithm.

In some example implementations, processor(s) 1510 may also be configured to dynamically display remaining objects such that the number of displayed objects is less than or equal to the limit.

In some example implementations, processor(s) 1510 may also be configured to generate a second visualization for a parent node, the second visualization displaying the parent node and one or more child nodes associated with the parent node, where the second visualization is displayed separately from the first visualization, for example, as described in connection with FIG. 4. The processor(s) 1510 may also be configured to display, in the first visualization displaying the map, one or mom parent nodes with the one or more subsets of conductive lines; and, when a respective parent node is associated with one or more child nodes, display a graphical indicator associated with the respective parent node indicative that the respective parent node is associated with the one or more child nodes, for example, as described in connection with FIG. 6.

In some example implementations, processor(s) 1510 may also be configured to generate a third visualization for displaying a tree diagram of the objects of the power distribution network, where the tree diagram comprises a first branch graphically displaying the nodes and a second branch graphically displaying the links, for example, as shown in FIGS. 1 and 13. In some implementations, the processor(s) 1510 may be configured to, at least one of: display, in the third visualization, a first icon adjacent to a first node in the tree diagram, the first icon indicative that the first node is a parent node associated with one or more child nodes; display, in the third visualization, a second icon adjacent to a second node in the tree diagram, the second icon indicative that the second node is not displayed in the map; and displaying, in the third visualization, a third icon adjacent to a third node in the tree diagram, the third icon indicative that the third node is a child node associated with a parent node, for example, as shown in FIG. 5.

Additionally, according to some implementations, the processor(s) 1510 may be configured to display, in the tree diagram of the third visualization, objects displayed in the map differently than the objects that are not displayed in the map, for example, with a highlighted box surrounding the objects not displayed in the map, for example, as shown in FIG. 13.

Some portions of the detailed description are presented in terms of algorithms and symbolic representations of operations within a computer. These algorithmic descriptions and symbolic representations are the means used by those skilled in the data processing arts to convey the essence of their innovations to others skilled in the art. An algorithm is a series of defined steps leading to a desired end state or result. In example implementations, the steps carried out require physical manipulations of tangible quantities for achieving a tangible result.

Unless specifically stated otherwise, as apparent from the discussion, it is appreciated that throughout the description, discussions utilizing terms such as "processing," "computing," "calculating," "determining," "displaying," or the like, can include the actions and processes of a computer system or other information processing device that manipulates and transforms data represented as physical (electronic) quantities within the computer system's registers and memories into other data similarly represented as physical quantities within the computer system's memories or registers or other information storage, transmission or display devices.

Example implementations may also relate to an apparatus for performing the operations herein. This apparatus may be specially constructed for the required purposes, or it may include one or more general-purpose computers selectively activated or reconfigured by one or more computer programs. Such computer programs may be stored in a computer readable medium, such as a computer readable storage medium or a computer readable signal medium. A computer readable storage medium may involve tangible mediums such as, but not limited to, optical disks, magnetic disks, read-only memories, random access memories, solid-state devices, and drives, or any other types of tangible or non-transitory media suitable for storing electronic information. A computer readable signal medium may include mediums such as carrier waves. The algorithms and displays presented herein are not inherently related to any particular computer or other apparatus. Computer programs can involve pure software implementations that involve instructions that perform the operations of the desired implementation.

Various general-purpose systems may be used with programs and modules in accordance with the examples herein, or it may prove convenient to construct a more specialized apparatus to perform desired method steps. In addition, the example implementations are not described with reference to any particular programming language. It will be appreciated that a variety of programming languages may be used to implement the teachings of the example implementations as described herein. The instructions of the programming language(s) may be executed by one or more processing devices, e.g., central processing units (CPUs), processors, or controllers.

As is known in the art, the operations described above can be performed by hardware, software, or some combination of software and hardware. Various aspects of the example implementations may be implemented using circuits and logic devices (hardware), while other aspects may be implemented using instructions stored on a machine-readable medium (software), which if executed by a processor, would cause the processor to perform a method to carry out implementations of the present application. Further, some example implementations of the present application may be performed solely in hardware, whereas other example implementations may be performed solely in software. Moreover, the various functions described can be performed in a single unit, or can be spread across a number of components in any number of ways. When performed by software, the methods may be executed by a processor, such as a general-purpose computer, based on instructions stored on a computer readable medium. If desired, the instructions can be stored on the medium in a compressed and/or encrypted format.

Moreover, other implementations of the present application will be apparent to those skilled in the art from consideration of the specification and practice of the teachings of the present application. Various aspects and/or components of the described example implementations may be used singly or in any combination. It is intended that the specification and example implementations be considered as examples only, with the true scope and spirit of the present application being indicated by the following claims.

What is claimed:

1. A power distribution network visualization method, the method comprising:
setting a limit of objects of the power distribution network to be displayed on a map, the objects comprising at least nodes and links between the nodes, the links comprising at least conductive lines;
when a total number of the objects exceeds a limit:
selecting one or more subsets of the conductive lines based on one or more conditions related to the conductive lines; and
generating a first visualization displaying the map comprising a subset of the objects including the one or more subsets of the conductive lines, wherein a number of displayed objects is less than or equal to the limit;
selecting a plurality of subsets of the conductive lines based on a plurality of conditions related to the conductive lines; and
displaying only the plurality of subsets of the conductive lines,
wherein the selecting the plurality of subsets comprises:
selecting a first subset of the conductive lines based on a first condition related to the conductive lines;
selecting a subset of remaining conductive lines based on a second condition; and
displaying at least the first and second subsets,
wherein the first condition is based on lengths of the conductive lines exceeding a length threshold, and
wherein the second condition is a random selection algorithm.

2. The method of claim 1, wherein the first condition is different than the second condition.

3. The method of claim 1, further comprising, when the total number of the objects is less than or equal to the limit, displaying all of the objects.

4. The method of claim 1, further comprising dynamically displaying remaining objects such that the number of displayed objects is less than or equal to the limit.

5. The method of claim 1, wherein the nodes of the power distribution network comprise parent nodes and child nodes, wherein each child node is associated with a parent node, the method further comprising:
generating a second visualization for a parent node, the second visualization displaying the parent node and one or more child nodes associated with the parent node; and
displaying the second visualization separately from the first visualization.

6. The method of claim 1, wherein the nodes of the power distribution network comprise parent nodes and child nodes, wherein each child node is associated with a parent node, the method further comprising:
displaying, in the first visualization displaying the map, one or more parent nodes with the one or more subsets of conductive lines; and
when a respective parent node is associated with one or more child nodes, displaying a graphical indicator associated with the respective parent node indicative that the respective parent node is associated with the one or more child nodes.

7. The method of claim 1, further comprising:
generating a third visualization for displaying a tree diagram of the objects of the power distribution network, wherein the tree diagram comprises a first branch graphically displaying the nodes and a second branch graphically displaying the links.

8. The method of claim 7, wherein the nodes of the power distribution network comprise parent nodes and child nodes, wherein each child node is associated with a parent node, the method further comprising:
displaying, in the third visualization, a first icon adjacent to a first node in the tree diagram, the first icon indicative that the first node is a parent node associated with one or more child nodes.

9. The method of claim 7, wherein the nodes of the power distribution network comprise parent nodes and child nodes, wherein each child node is associated with a parent node, the method further comprising:
displaying, in the third visualization, a second icon adjacent to a second node in the tree diagram, the second icon indicative that the second node is not displayed in the map.

10. The method of claim 7, wherein the nodes of the power distribution network comprise parent nodes and child nodes, wherein each child node is associated with a parent node, the method further comprising:
displaying, in the third visualization, a third icon adjacent to a third node in the tree diagram, the third icon indicative that the third node is a child node associated with a parent node.

11. The method of claim 7, further comprising:
displaying, in the tree diagram of the third visualization, objects displayed in the map differently than the objects that are not displayed in the map.

12. The method of claim 11, wherein the objects not displayed in the map are displayed in the tree diagram, with a highlighted box surrounding the objects not displayed in the map.

13. A power distribution network visualization system comprising:
one or more memories configured to store a program; and
one or more processors coupled to the one or more memories and configured to execute instructions to:
set a limit of objects of the power distribution network to be displayed on a map, the objects comprising at least nodes and links between the nodes, the links comprising conductive lines;
when a total number of the objects exceeds a limit,
select one or more subsets of the conductive lines based on one or more conditions related to the conductive lines; and
generate a first visualization displaying the map comprising a subset of the objects including the one or more subsets of the conductive lines, wherein a number of displayed objects is less than or equal to the limit;
select a plurality of subsets of the conductive lines based on a plurality of conditions related to the conductive lines;
display only the plurality of subsets of the conductive lines;
select a first subset of the conductive lines based on a first condition related to the conductive lines;
select a subset of remaining conductive lines based on a second condition; and
display at least the first and second subsets,
wherein the first condition is based on lengths of the conductive lines exceeding a length threshold, and
wherein the second condition is a random selection algorithm.

14. A non-transitory computer-readable medium, storing instructions for generating a visualization of a power distribution network, the instructions comprising:
setting a limit of objects of the power distribution network to be displayed on a map, the objects comprising at least nodes and links between the nodes, the links comprising conductive lines;
when a total number of the objects exceeds a limit,
selecting one or more subsets of the conductive lines based on one or more conditions related to the conductive lines; and
generating a first visualization displaying the map comprising a subset of the objects including the one or more subsets of the conductive lines, wherein a number of displayed objects is less than or equal to the limit;
selecting a plurality of subsets of the conductive lines based on a plurality of conditions related to the conductive lines; and
displaying only the plurality of subsets of the conductive lines,
wherein the selecting the plurality of subsets comprises:
selecting a first subset of the conductive lines based on a first condition related to the conductive lines;
selecting a subset of remaining conductive lines based on a second condition; and
displaying at least the first and second subsets,
wherein the first condition is based on lengths of the conductive lines exceeding a length threshold, and
wherein the second condition is a random selection algorithm.

* * * * *